United States Patent
Chen et al.

(10) Patent No.: US 12,057,728 B2
(45) Date of Patent: Aug. 6, 2024

(54) CHARGING MANAGEMENT METHOD, GRAPHICAL USER INTERFACE, AND RELATED APPARATUS

(71) Applicant: Huawei Technologies Co., Ltd., Shenzhen (CN)

(72) Inventors: Liangjin Chen, Shanghai (CN); Jingsong Han, Shanghai (CN); Yuxiang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 625 days.

(21) Appl. No.: 17/277,498

(22) PCT Filed: Sep. 16, 2019

(86) PCT No.: PCT/CN2019/105986
§ 371 (c)(1),
(2) Date: Mar. 18, 2021

(87) PCT Pub. No.: WO2020/063386
PCT Pub. Date: Apr. 2, 2020

(65) Prior Publication Data
US 2022/0029444 A1    Jan. 27, 2022

(30) Foreign Application Priority Data
Sep. 30, 2018    (CN) .......................... 201811162909.1

(51) Int. Cl.
*H02J 7/00*    (2006.01)
*H01M 10/44*    (2006.01)

(52) U.S. Cl.
CPC ..... *H02J 7/007182* (2020.01); *H01M 10/443* (2013.01); *H02J 7/0029* (2013.01); *H02J 7/0047* (2013.01); *H02J 7/007194* (2020.01)

(58) Field of Classification Search
USPC ........................................................ 320/153
See application file for complete search history.

(56) References Cited

U.S. PATENT DOCUMENTS 8,125,186 B2 * 2/2012 Carkner ................ H02J 7/0048
324/426
2007/0075678 A1    4/2007 Ng et al.
(Continued)

FOREIGN PATENT DOCUMENTS

CN    103985917 A    8/2014
CN    104037462 A    9/2014
(Continued)

OTHER PUBLICATIONS

ITU-T H.264 "Series H: Audiovisual and Multimedia Systems, Infrastructure of audiovisual services—Coding of moving video, Advanced video coding for generic audiovisual services," Apr. 2017, 812 pages.

*Primary Examiner* — Samuel Berhanu
(74) *Attorney, Agent, or Firm* — Conley Rose, P.C.

(57) ABSTRACT

A charging management method includes charging the battery, stopping charging the battery when a first battery voltage of the battery reaches V1, and displaying prompt information when a working parameter of the battery meets a first condition. The working parameter is first working durations of the battery at a plurality of temperatures, or second working durations of the battery at a plurality of second battery voltages.

20 Claims, 19 Drawing Sheets

(56) References Cited

U.S. PATENT DOCUMENTS

| | | | |
|---|---|---|---|
| 2010/0244567 A1* | 9/2010 | Brookshire | H01M 10/48 307/66 |
| 2014/0253042 A1 | 9/2014 | Su et al. | |
| 2014/0285153 A1 | 9/2014 | Fukunaga et al. | |
| 2015/0048797 A1 | 2/2015 | Song | |
| 2016/0149418 A1* | 5/2016 | Jung | H02J 7/007194 320/152 |
| 2018/0205236 A1 | 7/2018 | Fu et al. | |

FOREIGN PATENT DOCUMENTS

| | | |
|---|---|---|
| CN | 203933072 U | 11/2014 |
| CN | 104750597 A | 7/2015 |
| CN | 105137358 A | 12/2015 |
| CN | 105633495 A | 6/2016 |
| CN | 106159152 A | 11/2016 |
| CN | 106207291 A | 12/2016 |
| CN | 106451640 A | 2/2017 |
| CN | 107015157 A | 8/2017 |
| CN | 107024664 A | 8/2017 |
| CN | 105098729 B | 11/2017 |
| CN | 105277896 B | 1/2018 |
| CN | 108336431 A | 7/2018 |
| CN | 106526486 B | 11/2018 |
| CN | 107015158 B | 5/2019 |
| CN | 107367698 B | 8/2019 |
| EP | 3024113 A1 | 5/2016 |

* cited by examiner

CHARGING MANAGEMENT METHOD, GRAPHICAL USER INTERFACE, AND RELATED APPARATUS

CROSS-REFERENCE TO RELATED APPLICATIONS

This application is a U.S. National Stage of International Patent Application No. PCT/CN2019/105986 filed on Sep. 16, 2019, which claims priority to Chinese Patent Application No. 201811162909.1 filed on Sep. 30, 2018. The disclosures of the aforementioned applications are hereby incorporated by reference in their entireties.

TECHNICAL FIELD

This application relates to the field of battery technologies, and in particular, to a charging management method, a graphical user interface, and a related apparatus.

BACKGROUND

A battery is an apparatus that can convert chemical energy into electric energy, and is widely applied to power fields of portable electronic devices (for example, a mobile phone and a tablet computer), electric vehicles, aerospace, ships and submarines, and the like.

After the battery is put into use, a thickness of an electrode plate becomes thicker after high temperature impact of charging and discharging. An electrolyte is decomposed through oxidation reaction to generate a carbon dioxide ($CO_2$) gas. Therefore, the battery gradually expands, to be specific, a surface thickness increases. An expansion process of the battery is almost irreversible. In some cases (for example, under a high temperature condition and a high pressure condition), a positive electrode of the battery is continuously subject to oxidation reaction to generate the carbon dioxide gas. This accelerates expansion of the battery.

The expansion of the battery not only reduces a lifespan of the battery, but also damages a device configured with the battery when the battery expands to a certain extent. Referring to a mobile phone that is configured with a lithium-ion battery and that is shown in FIG. 1, an expanded battery pushes out a screen of the mobile phone, and the entire mobile phone is deformed and cannot be used. In addition, expansion of the battery may further cause battery spill, fire, and other dangers. Therefore, how to slow down the expansion of the battery and prolong the lifespan of the battery is a problem that urgently needs to be resolved currently.

SUMMARY

This application provides a charging management method, a graphical user interface, and a related apparatus, to reduce an expansion rate of a battery and prolong a lifespan of the battery.

According to a first aspect, this application provides a charging management method applied to a terminal. The terminal is configured with a terminal battery. The method may include: charging the terminal battery; if a working parameter of the terminal battery does not meet a first condition, stopping charging the terminal battery when a battery voltage reaches V1; and if the working parameter of the terminal battery meets the first condition, stopping charging the terminal battery when the battery voltage reaches V2, where V1>V2. The working parameter of the terminal battery includes working duration of the terminal battery at a plurality of temperatures, and/or working duration of the terminal battery at a plurality of battery voltages.

According to the method in the first aspect, if the working parameter of the terminal battery meets the first condition, charging of the terminal battery is stopped when the battery voltage reaches V2, so that duration of the battery that is in a high-voltage state can be relatively reduced. This reduces an expansion rate of the battery and slows down expansion of the battery.

In the charging management method in the first aspect, the terminal may obtain the working parameter of the battery. Optionally, the terminal may obtain the working parameter of the battery starting from time when the terminal battery is put into use. The working parameter of the terminal battery may reflect a health status of the terminal battery. Herein, the health status of the terminal battery may include a battery temperature, a battery voltage, an overall expansion thickness of the battery, a recent expansion thickness or aging of the battery, or the like.

In some embodiments, the working parameter of the battery may be a working parameter of the terminal battery from the time when the battery is put into use to current time, or may be a working parameter of the terminal battery in a recent period of time. Optionally, the working parameter of the battery may be recorded in a table manner.

Herein, the working duration in the working parameter may be time after the battery is delivered from a factory, or may be time after the battery is configured on the terminal, or may be time for charging and/or discharging the battery. This is not limited in this application.

In some embodiments, the first condition may include that an expansion parameter of the terminal battery is greater than a threshold. Herein, the expansion parameter may reflect an expansion thickness of the battery. Specifically, the terminal may obtain the expansion parameter of the terminal battery based on the working parameter of the terminal battery. The following provides two possible manners in which the terminal obtains the expansion parameter of the terminal battery based on the working parameter of the terminal battery.

In a first manner, the terminal obtains an overall expansion parameter of the terminal battery based on the working parameter of the terminal battery from the time when the terminal battery is put into use to the current time. The overall expansion parameter may reflect an overall expansion thickness of the terminal battery from the time when the terminal battery is put into use to the current time.

Optionally, the terminal may obtain the overall expansion parameter of the terminal battery in a weighting calculation manner.

For example, the terminal may obtain the overall expansion parameter of the terminal battery by using the formula 1:

$$A = \sum_{j=1}^{m} \sum_{i=1}^{n} (t(T_i, V_j) \times a(T_i, V_j)) \qquad \text{formula 1}$$

In the formula 1, A is the overall expansion parameter of the terminal battery from the time when the terminal battery is put into use to the current time, $T_i$ is an $i^{th}$ temperature range, $V_j$ is a $j^{th}$ voltage range, $t(T_i, V_j)$ is duration from the time when the terminal is put into use to the current time when a battery temperature is $T_i$ and a battery voltage is $V_j$, $a(T_i, V_j)$ is an expansion coefficient when the terminal battery temperature is $T_i$ and the terminal battery voltage is $V_j$, $1 \leq i \leq n$, $1 \leq j \leq m$, i and j are positive integers, n is a total quantity of divided temperature ranges, and m is a total quantity of divided voltage ranges.

In the first manner, a threshold corresponding to the overall expansion parameter of the terminal battery is not limited to a default setting when the terminal is delivered from the factory, and may be further independently set by a user. For example, the first condition may be that the overall expansion parameter of the terminal battery is greater than a first critical value.

In a second manner, the terminal obtains a recent expansion parameter of the terminal battery based on a recent working parameter of the terminal battery. The recent expansion parameter may reflect a recent expansion thickness of the terminal battery.

Optionally, the terminal may obtain the recent expansion parameter of the terminal battery in the weighting calculation manner.

For example, the terminal may obtain the recent expansion parameter of the terminal battery by using the formula 2:

$$B=\Sigma_{j=1}^{m}\Sigma_{i=1}^{n}(t'(T_i,V_j) \times a'(T_i,V_j))  \quad \text{formula 2}$$

In the formula 2, B is the recent expansion parameter of the terminal battery, $T_i$ is an $i^{th}$ temperature range, $V_j$ is a $j^{th}$ voltage range, $t'(T_i, V_j)$ is duration when a recent terminal temperature is $T_i$ and a recent terminal voltage is $V_j$, $a'(T_i, V_j)$ is an expansion coefficient when the terminal battery temperature is $T_i$ and the terminal battery voltage is $V_j$, $1 \leq i \leq n$, $1 \leq j \leq m$, i and j are positive integers, n is a total quantity of divided temperature ranges, and m is a total quantity of divided voltage ranges.

In the second manner, a threshold corresponding to the recent expansion parameter of the terminal battery is not limited to a default setting when the terminal is delivered from the factory, and may be further independently set by the user. For example, the first condition may be that the recent expansion parameter of the terminal battery is greater than a third critical value.

In the two manners of obtaining the expansion parameter of the terminal battery based on the working parameter of the terminal battery, the expansion coefficient of the terminal battery may be stored in the terminal, or may be obtained by the terminal by using a network. In a possible implementation, the expansion coefficient of the battery may be obtained by a research and development person by using an experimental test. It may be understood that the research and development person may separately obtain expansion coefficients of batteries of different models. In some embodiments, the first condition may further include that working duration of the battery at a high voltage and at a high temperature exceeds a first value, that continuous charging/discharging duration of the battery exceeds a third value, and the like. The high voltage and the high temperature may be default settings when the terminal is delivered from the factory, or may be independently set by the terminal or the user.

In an optional implementation, V1 may be an initial charging cutoff voltage or a maximum design voltage.

In a possible implementation, if the working parameter of the terminal battery meets the first condition, the terminal may reduce a charging cutoff voltage from V1 to V2, to stop charging the terminal battery when the battery voltage reaches V2.

In a possible implementation, the terminal may obtain the expansion parameter of the terminal battery based on the working parameter of the terminal battery, and determine a value of V2 based on the expansion parameter of the terminal battery. A larger expansion parameter of the terminal battery indicates a thicker expansion thickness of the terminal battery and a smaller value of V2. Optionally, the terminal may divide a plurality of expansion parameter ranges, and determine V2 based on an expansion range in which the expansion parameter of the terminal battery is located.

According to a second aspect, this application provides another charging management method applied to a terminal. The terminal is configured with a terminal battery. The method may include: charging the terminal battery, and stopping charging the terminal battery when a battery voltage reaches V1; and displaying, by the terminal, prompt information if a working parameter of the terminal battery meets a first condition. The working parameter of the terminal battery includes working duration of the terminal battery at a plurality of temperatures, and/or working duration of the terminal battery at a plurality of battery voltages.

According to the method in the second aspect, if the working parameter of the terminal battery meets the first condition, the terminal displays the prompt information, to notify a user of a current health status of the battery. After the user is notified by using the prompt information, the user may take a specific measure to protect the battery, to ensure battery health.

In the method in the second aspect, the working parameter of the terminal battery and the first condition are the same as those in the first aspect, and reference may be made to related description.

Specifically, when the working parameter of the terminal battery meets the first condition, the prompt information displayed by the terminal may be used to notify the user of a health status of the battery. Herein, the health status of the terminal battery may include a battery temperature, a battery voltage, an overall expansion thickness of the battery, a recent expansion thickness or aging of the battery, or the like.

For example, the prompt information may be displayed at a top of a touchscreen of the terminal in a form of a pop-up window, or may be displayed in a notification bar of the terminal, or may be displayed in a form of a score.

In some embodiments, the method in the second aspect may further include: receiving, by the terminal, a first user operation input by a user; and enabling, by the terminal, a battery protection mode in response to the first user operation; and when the terminal battery is charged in the battery protection mode, stopping charging the terminal battery when the battery voltage reaches V2, where V1>V2.

Herein, a value of V2 is the same as that in the first aspect, and reference may be made to related description.

In a possible implementation, the first user operation includes a tap operation performed on an enable option of the battery protection mode, and the enable option of the battery protection mode may be displayed on a battery setting interface.

In some embodiments, the method in the first aspect may further include: If the working parameter of the terminal battery meets a second condition, the terminal notifies the user of replacing the terminal battery.

In a possible implementation, the second condition may include that an expansion parameter of the terminal battery is greater than a second critical value. The expansion parameter herein is an overall expansion parameter of the terminal battery. For a definition and an obtaining manner of the expansion parameter, refer to related description of the first manner in the first aspect.

For example, the terminal may notify the user of replacing the battery in a floating window form, or may notify the user of replacing the battery in a manner of a prompt tone, vibration, indicator blinking, displaying the prompt information in the pop-up window at the top of the screen or in the notification bar, or the like. This is not limited in this application.

According to a third aspect, this application provides a graphical user interface on a terminal. The terminal has a display screen, a memory, and one or more processors configured to execute one or more programs stored in the memory.

If a working parameter of the terminal battery meets a first condition, the graphical user interface displays prompt information. The working parameter of the terminal battery includes working duration of the terminal battery at a plurality of temperatures, and/or working duration of the terminal battery at a plurality of battery voltages.

Herein, the working parameter of the terminal battery and the first condition are the same as those in the first aspect, and reference may be made to related description.

In some embodiments, the prompt information is displayed at a top of a touchscreen of the terminal in a form of a pop-up window.

According to a fourth aspect, this application provides a terminal, including one or more processors and one or more memories. The one or more memories are coupled to the one or more processors, the one or more memories are configured to store computer program code, the computer program code includes a computer instruction, and when the one or more processors execute the computer instruction, the terminal performs the charging management method provided in the first aspect.

According to a fifth aspect, this application provides a terminal, including one or more processors and one or more memories. The one or more memories are coupled to the one or more processors, the one or more memories are configured to store computer program code, the computer program code includes a computer instruction, and when the one or more processors execute the computer instruction, the terminal performs the charging management method provided in the second aspect.

According to a sixth aspect, this application provides a computer storage medium, including a computer instruction. When the computer instruction is run on a terminal, the terminal is enabled to perform the charging management method provided in the first aspect.

According to a seventh aspect, this application provides a computer storage medium, including a computer instruction. When the computer instruction is run on a terminal, the terminal is enabled to perform the charging management method provided in the second aspect.

According to this application, the expansion rate of the battery can be reduced, and the lifespan of the battery can be prolonged.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes the technical solutions in embodiments of this application with reference to accompanying drawings in the embodiments of this application.

In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, "a plurality of" means two or more than two unless otherwise specified.

In this application, a battery may be widely applied to power fields of portable electronic devices (for example, a mobile phone and a tablet computer), electric vehicles, aerospace, ships and submarines, and the like. In this application, types of the battery may include a lithium-ion battery (Lithium-ion battery), a nickel metal hydride battery (Ni-MH battery), a lithium polymer battery (Li-polymer battery), a lead-acid battery (Lead-Sealed battery), and the like. In the following embodiments, a terminal configured with the battery is used as an example to describe a charging management method provided in this application.

For ease of understanding of this application, some human-computer interaction embodiments of this application are first described.

In some embodiments of this application, the terminal may be configured with a battery protection mode, and a user may enable the battery protection mode based on a requirement. After the terminal enables the battery protection mode, an expansion rate of the battery can be reduced, and a lifespan of the battery can be prolonged.

Figure 1:
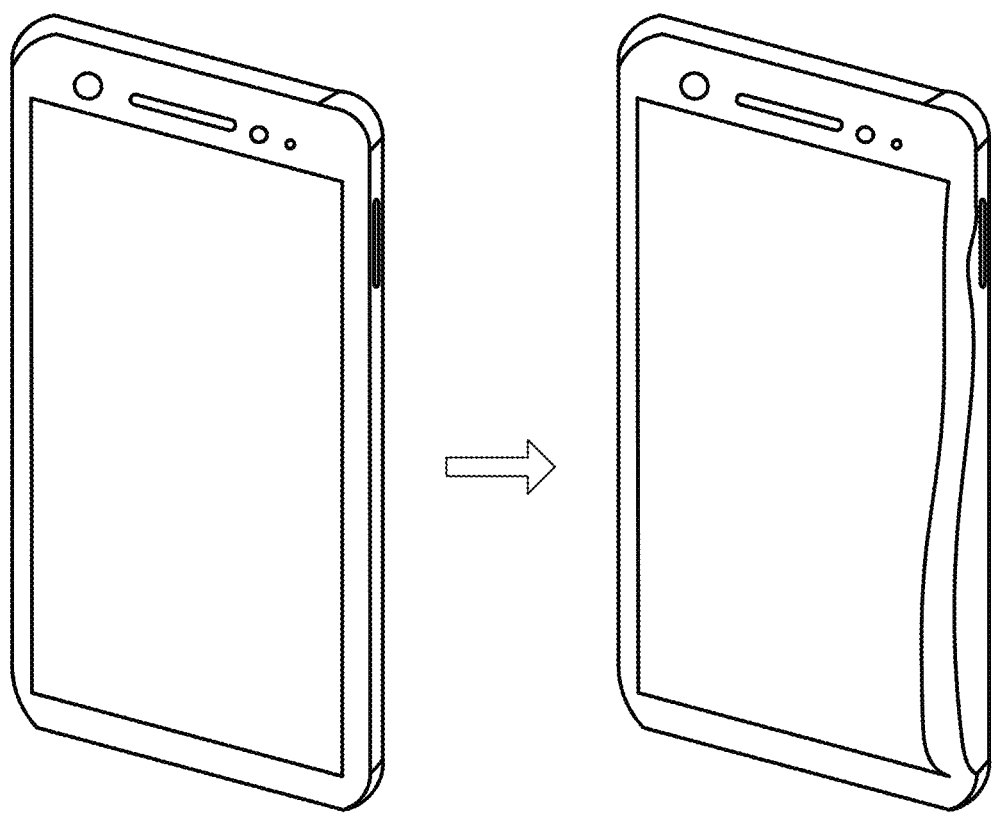
FIG. 1 is a schematic diagram of battery expansion.
Figure 2A:
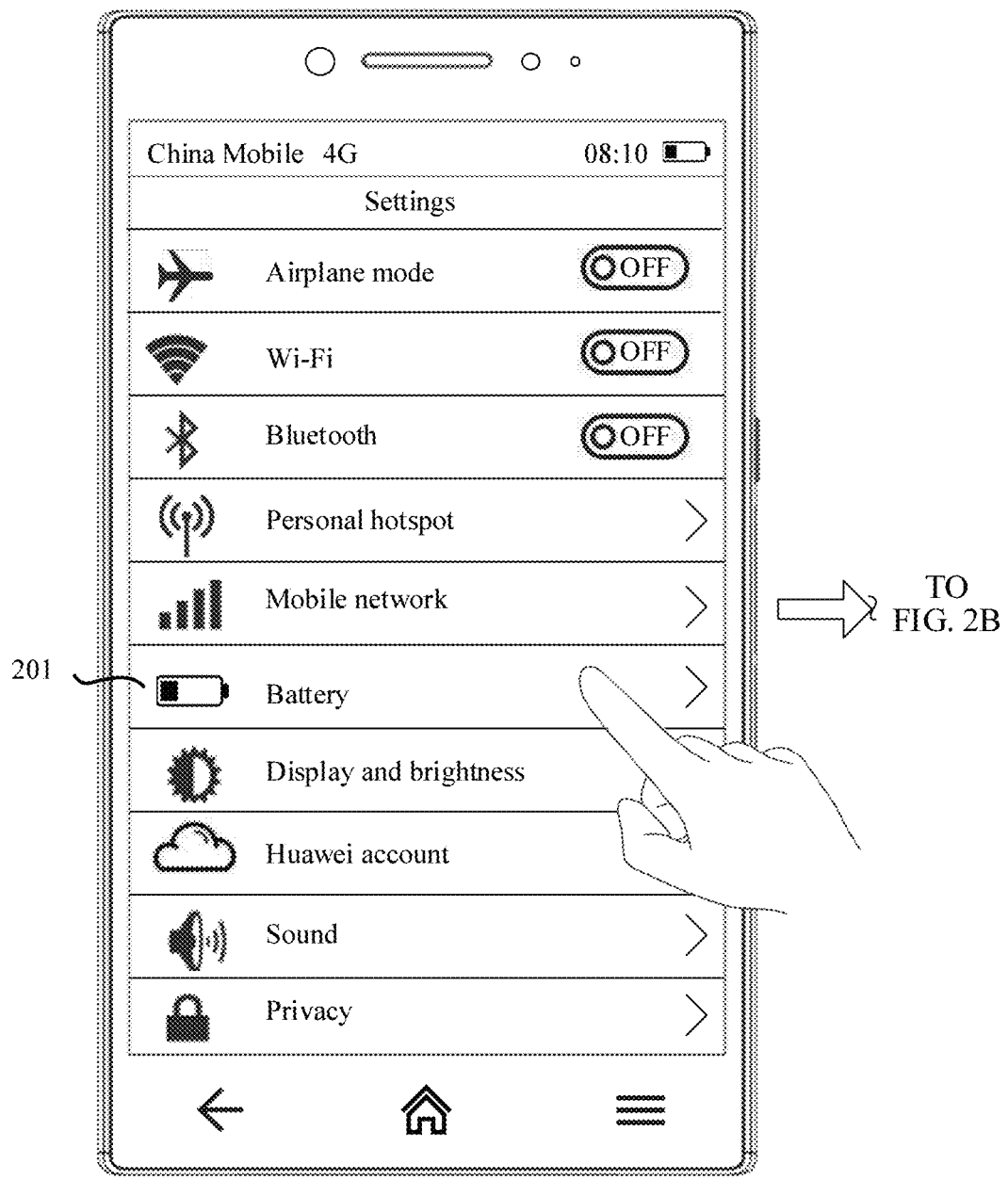
FIG. 2A to FIG. 6B are schematic diagrams of human-computer interaction according to this application.
Figure 2B:
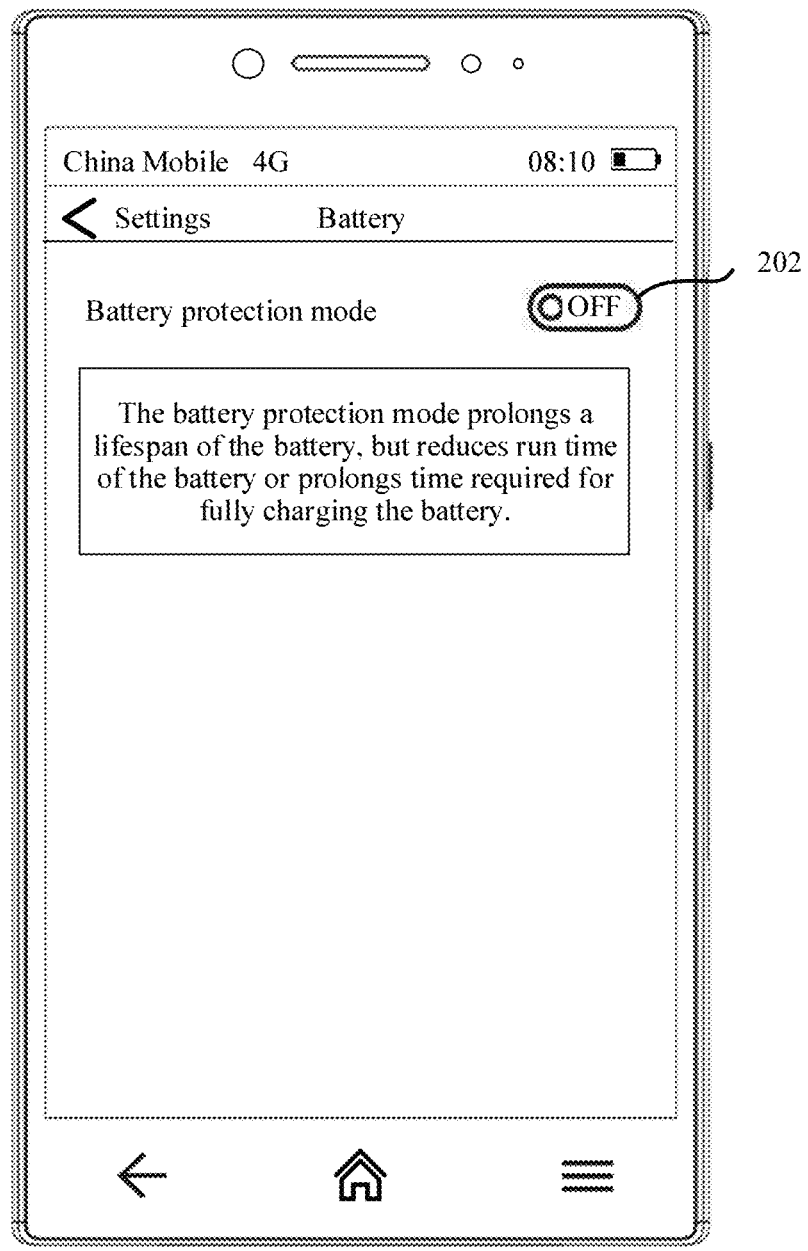

For example, FIG. 2A and FIG. 2B show a possible method for enabling a battery protection mode by a user. As shown in the accompanying drawing on the left side of FIG. 2A and FIG. 2B, a screen of the terminal displays interface content currently output by a system, and the interface content includes a setting interface. In some embodiments, the interface content output by the terminal is output by the terminal in response to an input user operation, and the user operation may include a tap operation performed by the user on a setting icon on a desktop displayed by the terminal. As shown in the accompanying drawing on the left side of FIG. 2A and FIG. 2B, the setting interface may include a plurality of setting options (for example, an airplane mode, Wi-Fi, Bluetooth, a personal hotspot, a mobile network, and a battery). The user may tap any setting option to perform corresponding setting (for example, enable the airplane mode or enable the Bluetooth).

In some embodiments, not limited to the setting interface, the interface content output by the system may further include a system-level interface element, for example, a status bar or a navigation bar. The status bar may include an operator name (for example, China Mobile), time, a Wi-Fi icon, signal strength, a current remaining battery level, a Bluetooth icon, an alarm clock icon, and the like. The navigation bar may include a return button icon, a home screen button icon, a menu button icon, and the like.

As shown in the accompanying drawing on the right side of FIG. 2A and FIG. 2B, in response to a tap operation performed by the user on an battery option 201 in the setting interface, the screen of the terminal displays a battery setting interface. As shown in the accompanying drawing on the right side of FIG. 2A and FIG. 2B, the battery setting interface may include an on/off switch 202 of the battery protection mode, and a description of the battery protection mode. In the accompanying drawing on the right side of FIG. 2A and FIG. 2B, the battery protection mode is in an off state, and the user may tap the on/off switch 202 to enable the battery protection mode. The description of the battery protection mode may briefly introduce a function of the battery protection mode to the user. For example, as shown in the accompanying drawing on the right side of FIG. 2A and FIG. 2B, the description of the battery protection mode may be as follows: The battery protection mode prolongs the lifespan of the battery, but reduces run time of the battery or prolongs time required for fully charging the battery. For another example, the description of the battery protection mode may further be as follows: The battery protection mode reduces an actually used capacity of the battery to 80% of an actually available capacity. Herein, the capacity of the battery refers to a volume of electricity stored in the battery. In some possible implementations, the description of the battery protection mode may further include more abundant information, for example, a specific measure taken after the terminal enables the battery protection mode.

After the user enables the battery protection mode, the terminal takes a specific measure to reduce the expansion rate of the battery and prolong the lifespan of the battery. Herein, the measure taken by the terminal may be any one of the following measures:

(1) Taking a corresponding restrictive measure based on an overall expansion parameter of the terminal battery.

Herein, the overall expansion parameter of the battery may reflect an overall expansion thickness of the battery. Specifically, the overall expansion thickness of the battery refers to a thickness increased from time when the battery is put into use to current time. Herein, the thickness of the battery is a maximum distance between a front surface and a rear surface of the battery.

Herein, once the battery is put into use, the terminal starts to continuously record overall usage of the battery. Herein, the use may include any one of the following cases: the battery is delivered from a factory, the battery is powered for the first time, the battery is charged for the first time, and the like. In some embodiments, the terminal may obtain the overall expansion parameter of the battery based on the overall usage of the battery. In some embodiments, the overall usage of the battery includes working duration of the battery at a plurality of temperatures and/or a plurality of battery voltages from the time when the battery is put into use to the current time. In some embodiments, the terminal may obtain the overall expansion parameter of the battery in a weighting calculation manner.

In some embodiments, the restrictive measure taken by the terminal based on the overall expansion parameter of the battery may include: reducing a charging cutoff voltage of the battery and/or reducing a maximum charging current of the battery. Herein, the charging cutoff voltage of the battery is an actual maximum value that can be reached by a battery voltage when the battery is charged.

(2) Taking a corresponding restrictive measure based on a recent expansion parameter of the terminal battery.

Herein, the recent expansion parameter of the battery may reflect a recent expansion thickness of the battery. Specifically, the recent expansion thickness of the battery refers to a thickness of the battery increased in a recent period of time.

Herein, the terminal may continuously record recent usage of the battery when the battery is initially put into use, or may start to record recent usage of the battery after the battery protection mode is enabled. In some embodiments, the terminal may obtain the recent expansion parameter of the battery based on the recent usage of the battery. In some embodiments, the recent usage of the battery includes duration of the battery in each recent temperature range and/or each recent voltage range. Further, the terminal may obtain the recent expansion parameter of the battery through calculation based on the duration of the battery in each recent temperature range and/or each recent voltage range.

In some embodiments, the restrictive measure taken by the terminal based on the recent expansion parameter of the battery may include reducing the charging cutoff voltage of the battery and/or reducing the maximum charging current of the battery.

(3) Directly taking any type of restrictive measure, to be specific, directly reducing the charging cutoff voltage and/or the maximum charging current of the battery. It may be understood that the user may enable the battery protection mode by using the setting interface shown in FIG. 2A and FIG. 2B at any stage of using the terminal. For example, the user may enable the battery protection mode immediately when the terminal is initially used, or may enable the battery protection mode after the terminal is used for a period of time. This is not limited in this application.

In some embodiments, the display screen of the terminal may display a battery level, to notify the user of a current remaining battery level. The battery level displayed by the terminal corresponds to a battery voltage. When the charging cutoff voltage of the terminal is an initial charging cutoff voltage, the initial charging cutoff voltage is used as a standard of the battery level displayed on the display screen of the terminal, and the battery level displayed on the display screen of the terminal corresponds to a battery voltage. For example, referring to the second row of the second column in Table 5, when the terminal battery reaches the initial charging cutoff voltage during charging, in other words, when charging cannot continue, the battery level is displayed as 100%.

After the battery protection mode is enabled, if the restrictive measure taken by the terminal is to reduce the charging cutoff voltage, the battery level may be displayed in the following two manners. In a possible implementation, after the charging cutoff voltage is reduced, the initial charging cutoff voltage may be used as the standard of the battery level displayed by the terminal, and the battery level displayed by the terminal corresponds to an actual battery voltage. For example, referring to the third row of the third column in Table 5, when the terminal battery is charged and a reduced charging cutoff voltage (namely, an actual charging cutoff voltage) 4.2 V is reached, the battery level is displayed as 100%. In this manner, the user can be unaware of a decrease in the charging cutoff voltage, thereby improving user experience. In another possible implementation, after the charging cutoff voltage is reduced, the reduced charging cutoff voltage may be used as a standard of the battery level displayed by the terminal, and the battery level displayed by the terminal corresponds to an actual battery voltage. For example, referring to the third row of the second column in Table 5, when the terminal battery is charged and the reduced charging cutoff voltage (namely, the actual charging cutoff voltage) 4.2 V is reached, the battery level is displayed as 95%.

TABLE 1

Battery level displayed by the terminal

| Battery voltage | Charging cutoff voltage = 4.4 V | Charging cutoff voltage = 4.2 V | Charging cutoff voltage = 4.2 V |
|---|---|---|---|
| 4.4 V | 100% | | |
| 4.2 V | 95% | 95% | 100% |
| 4.0 V | 90% | 90% | 95% |
| 3.8 V | 86% | 86% | 90% |
| . . . | . . . | . . . | . . . |

Further, in some optional embodiments, after enabling the battery protection mode according to the method shown in FIG. 2A and FIG. 2B, the user may further disable the battery protection mode based on a requirement. Specifically, the user may tap the switch 202 that is in an on state, to disable the battery protection mode. After the battery protection mode is disabled, the terminal may continue to execute the restrictive measure that has been taken, or may exit or cancel the restrictive measure that has been taken. This is not limited herein.

In some embodiments of this application, the terminal may notify the user of a current health status of the battery. Herein, the health status of the battery may include any of the following: a battery temperature, the battery voltage, the overall expansion thickness of the battery, the recent expansion thickness or aging of the battery, or the like.

The following describes possible scenarios in which the terminal notifies the user of the current health status of the battery.

(1) When the overall/recent battery expansion parameter reaches a threshold, the user is notified of the current health status of the battery.

Specifically, the terminal continuously monitors the overall/recent usage of the battery. In some embodiments, the terminal may obtain the overall/recent expansion parameter of the battery based on the overall/recent usage of the battery. Herein, that the terminal continuously monitors the overall/recent usage of the battery means that when the terminal battery is initially put into use, the terminal starts to monitor the overall/recent usage of the battery.

In some embodiments, the overall usage of the battery includes the duration from the time when the battery is put into use to the current time when the battery is in each temperature range and/or each voltage range. In some embodiments, the terminal may obtain the overall expansion parameter of the battery in the weighting calculation manner.

In some embodiments, the recent usage of the battery includes duration of the battery in each recent temperature range and/or each recent voltage range. In some embodiments, the terminal may obtain the recent expansion parameter of the battery in the weighting calculation manner.

Not limited to a default setting when the terminal is delivered from the factory, the threshold may further be independently set by the user. In a possible implementation, when the terminal continuously monitors the overall usage of the battery, the corresponding threshold may be a first critical value. In another possible implementation, when the terminal continuously monitors the recent usage of the battery, the corresponding threshold may be a third critical value.

(2) The user is periodically notified of the current health status of the battery.

Specifically, the terminal may periodically notify the user of the current health status of the battery. For example, the terminal may notify the user at 9:00 every night or 9:00 every Monday morning.

Not limited to the two scenarios, the terminal may further notify the user of the current health status of the battery in another scenario. For example, when duration of the battery in a high-voltage state and a high-temperature state is greater than a first value, or when the battery is severely aged, the user is notified.

In this application, the terminal notifies the user of the current health status of the battery in a plurality of manners, and the plurality of manners are described in detail in the following.

In some embodiments, the terminal may notify the user of the current health status of the battery by using a pop-up window. For example, referring to FIG. 3a, when the screen of the terminal is unlocked, a pop-up window 301 may be displayed at the top of the screen, and the pop-up window 301 is displayed above the interface content (a desktop shown in FIG. 3a) currently output by the terminal system in a floating manner. When the screen of the terminal is locked, the terminal may display the pop-up window in the middle of the screen. Herein, not limited to content included in the pop-up window 301 in FIG. 3a, in specific implementation, the pop-up window displayed by the terminal may further include more detailed information, for example, an excessively high battery temperature, an excessively high battery voltage, and aging of the battery.

Herein, the pop-up window 301 displayed by the terminal at the top of the screen may receive an input user operation. The following describes in detail user operations that may be received by the pop-up window 301.

In a possible implementation, the user operation received by the pop-up window 301 may be a gesture in which a finger of the user slides from the pop-up window 301 to an upper part of the screen. In response to the slide gesture, the pop-up window 301 is no longer displayed at the top of the screen of the terminal.

Optionally, after the pop-up window 301 is no longer displayed at the top of the screen of the terminal, prompt information in the pop-up window 301 may be displayed in a notification bar. When the user opens the notification bar, the user may see the prompt information.

Herein, the user may open the notification bar by using a gesture of sliding downwards from the top of the screen on any interface content output by the screen of the terminal, or may open the notification bar by using a navigation button.

Figure 3A:
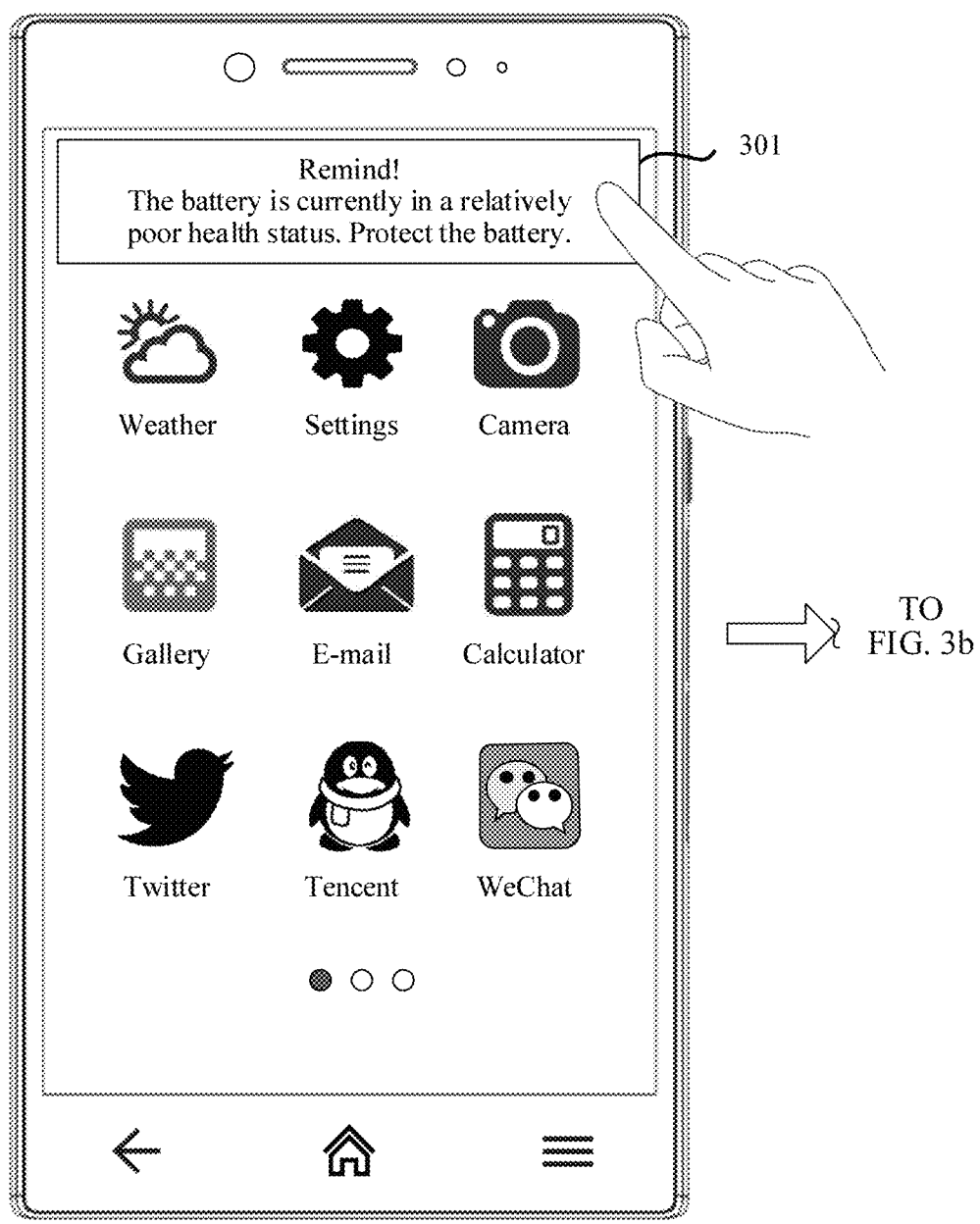

This is not limited in this application. For example, FIG. 3c shows a possible style of a notification bar. As shown in FIG. 3c, the notification bar includes prompt information 302 used to notify the user of the current health status of the battery, and may further include a date, weather, a location, a setting icon, a shortcut on/off icon of setting options (for example, WiFi, Bluetooth, and a personal hotspot), a screen brightness bar, another prompt information (for example, a WeChat message), and the like. In some embodiments, the prompt information 302 displayed in the notification bar may receive an input user operation (for example, a tap operation). In response to the user operation, the terminal may display details of the health status of the battery, or may display the battery setting interface shown in the accompanying drawing on the right side of FIG. 2A and FIG. 2B.

In another possible implementation, the user operation received by the pop-up window 301 may alternatively be a tap operation. In response to the tap operation, the screen of the terminal may display details of the health status of the battery, or may display the battery setting interface shown in the accompanying drawing on the right side of FIG. 2A and FIG. 2B.

Figure 3B:
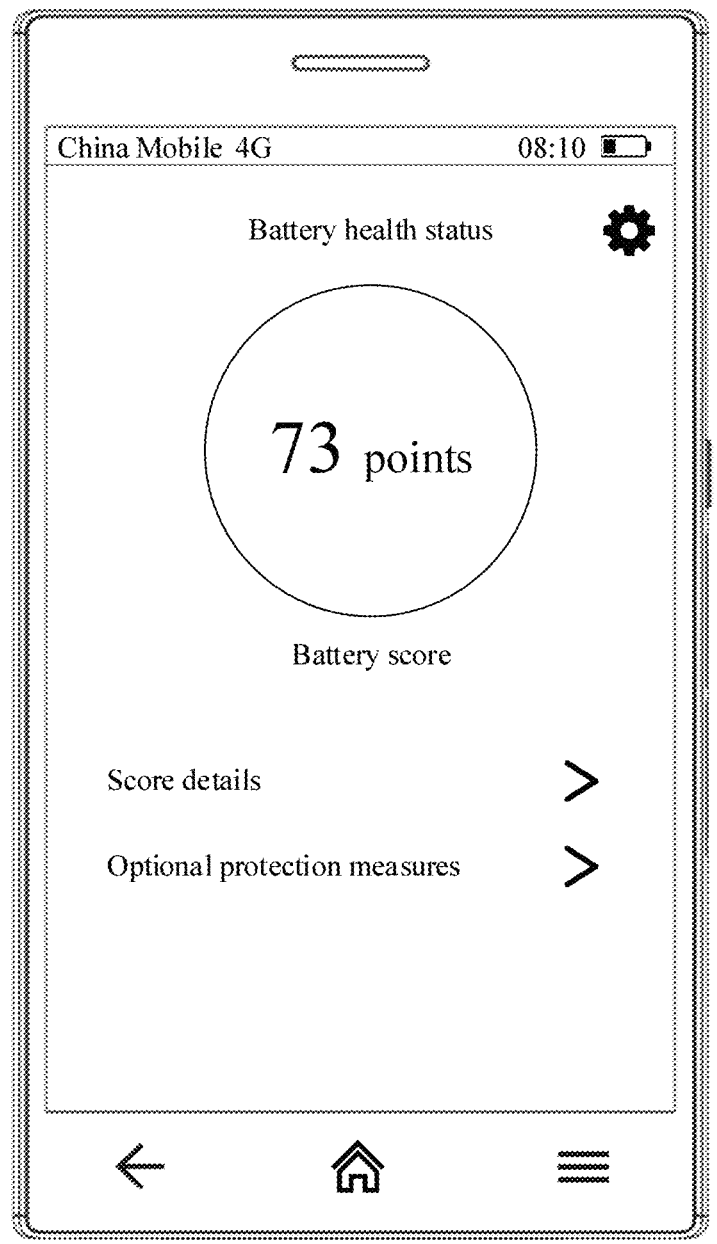
Figure 3C:
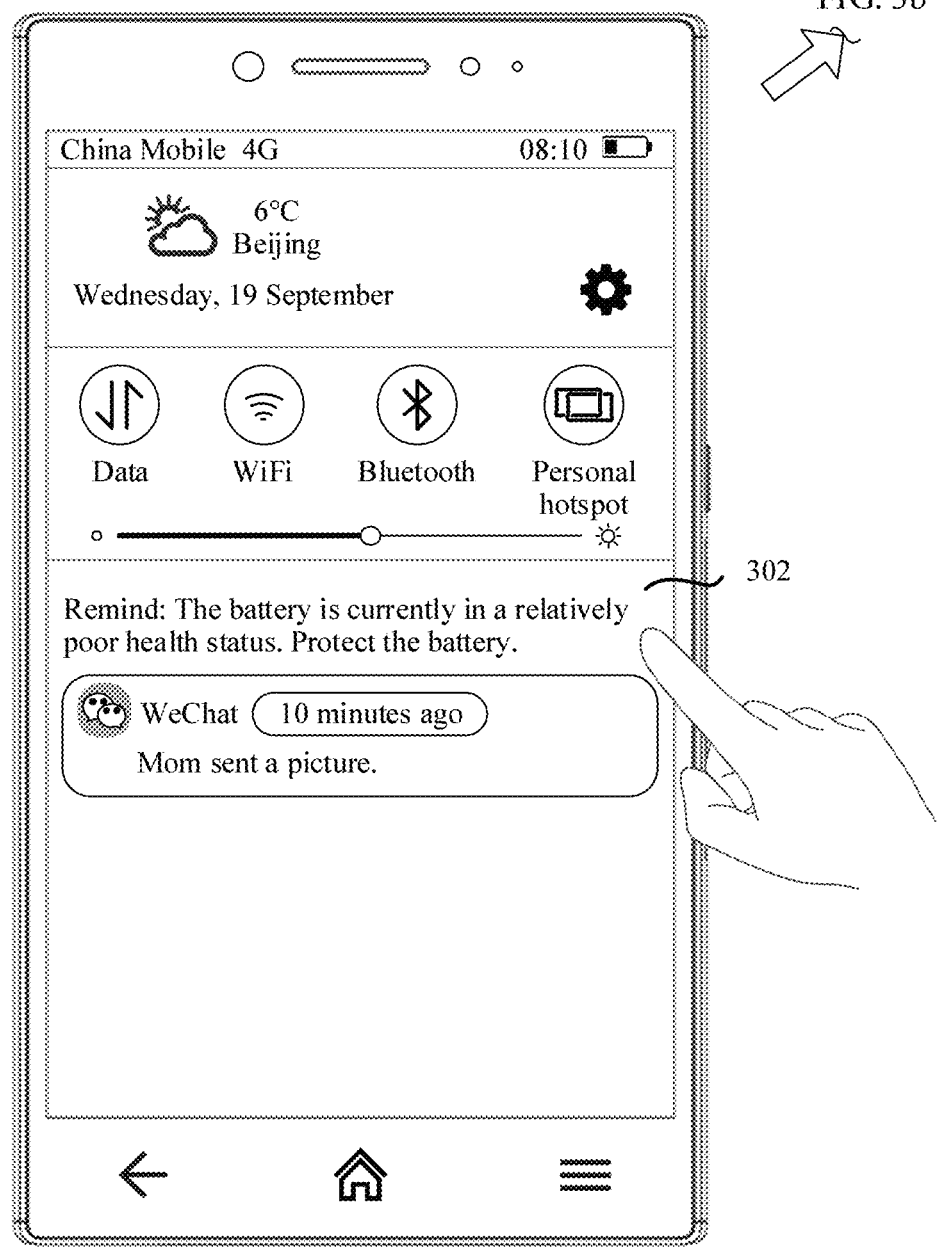

For example, FIG. 3b shows details of a possible health status of a battery. Specifically, the terminal may quantize the overall/recent expansion thickness of the battery into a score, so that the user can intuitively learn of the health status of the battery by using the score. When the overall/recent expansion thickness of the battery is higher, in other words, when the overall/recent expansion parameter of the battery is higher, the score of the battery is lower. Therefore, the scenario (1) may also be considered as that when the score of the battery is less than a second value, the user is notified of the current health status of the battery. In FIG. 3b, the health status of the battery is scored by using a 100-point system, and a current score of the battery is 73 points.

Figure 4A:
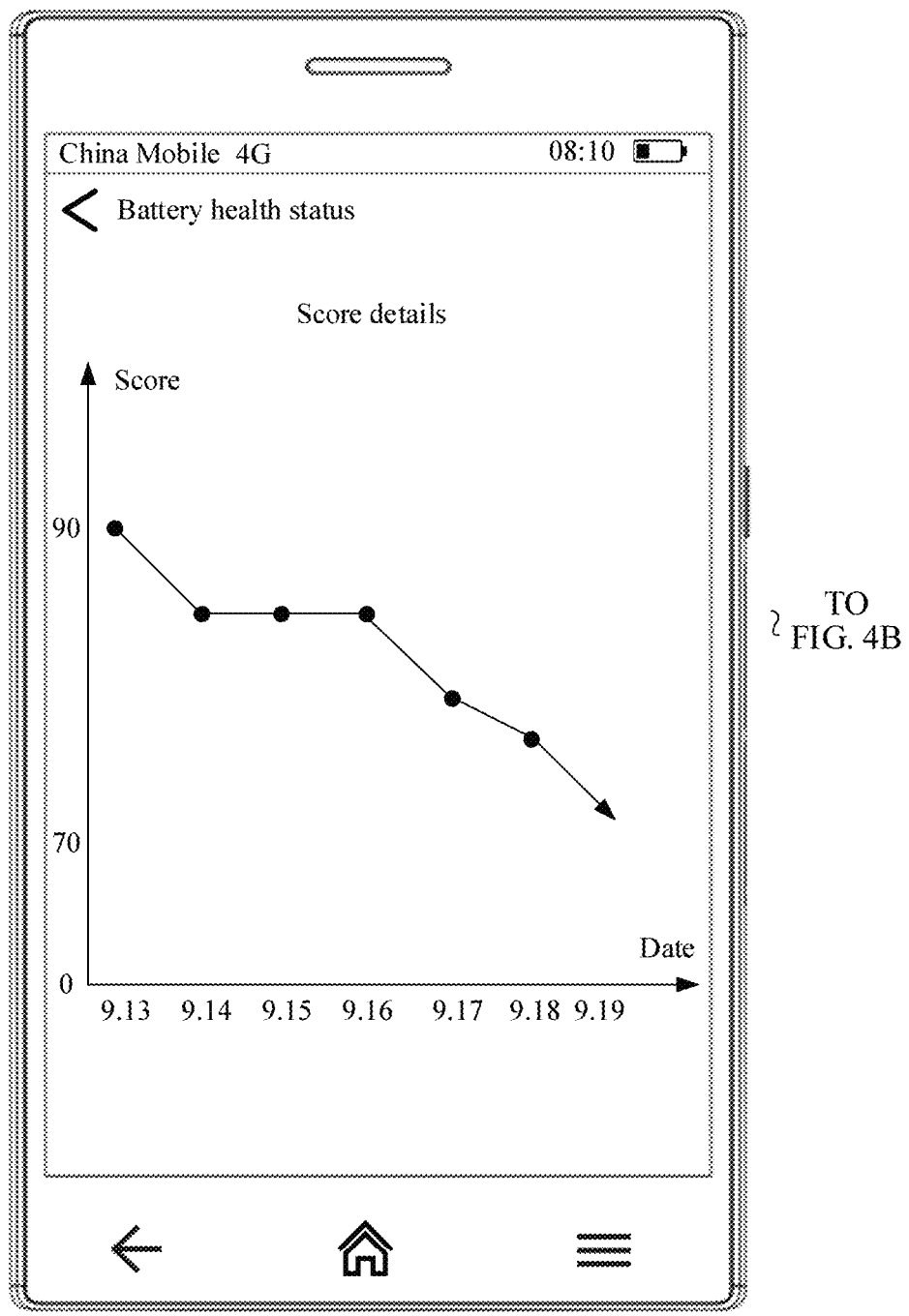
Figure 4B:
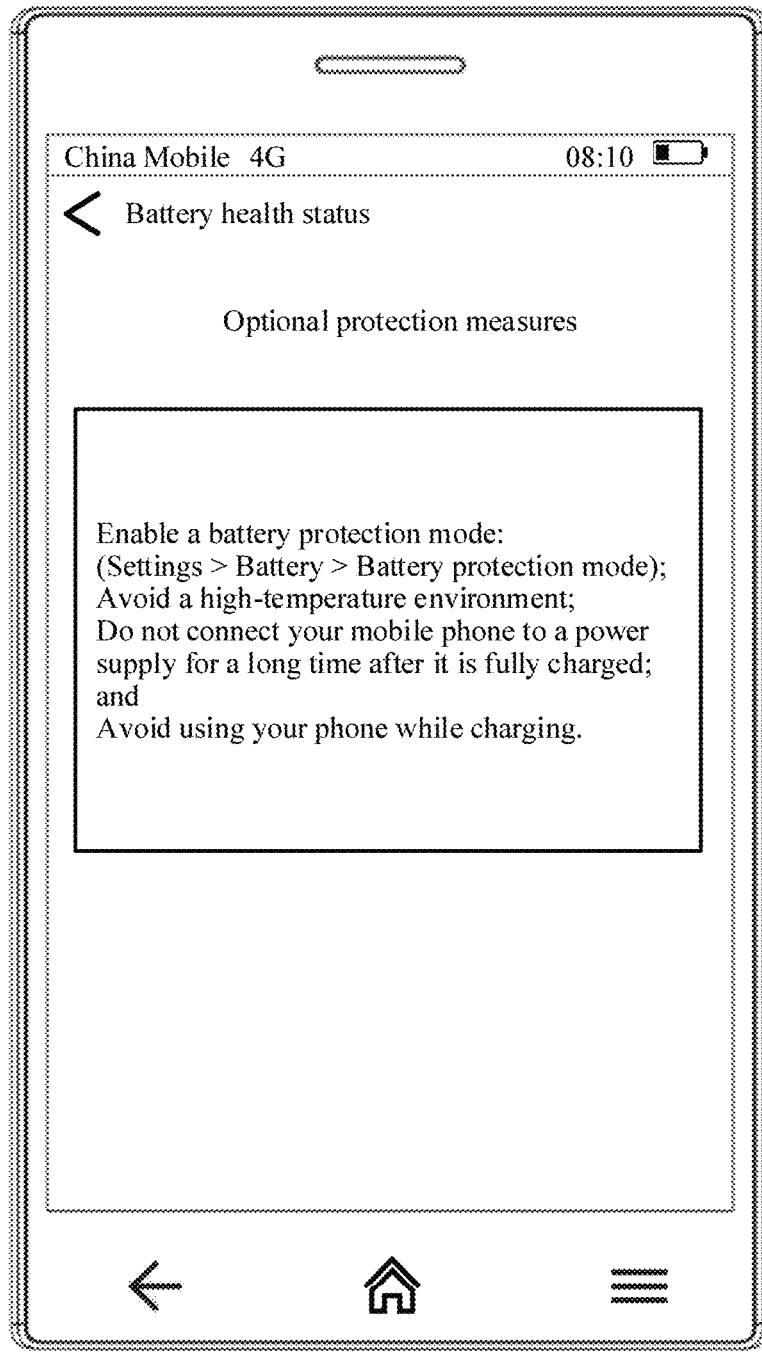

In some embodiments, the details of the health status of the battery may further include two options: "score details" and "optional protection measures" of the battery. The user may tap the "score details" to view a score trend of the battery in a period of time, and may tap the "optional protection measures" to view measures that can prolong the lifespan of the battery. For example, the accompanying drawing on the left side of FIG. 4A and FIG. 4B shows a possible recent battery score trend. For example, the accompanying drawing on the right side of FIG. 4A and FIG. 4B shows some possible measures for prolonging a battery lifespan. The measures include: enabling the battery protection mode, avoiding a high-temperature environment, preventing a mobile phone from being connected to a power supply for a long time after being fully charged (in other words, avoiding floating charge), preventing the mobile phone from being used while being charged, and the like.

In some embodiments, in FIG. 3a, default display duration of the pop-up window 301 displayed by the terminal at the top of the screen may be preset (for example, may be set to first duration). If the pop-up window 301 does not receive the input user operation within the first duration, the pop-up window 301 is no longer displayed at the top of the screen of the terminal. Optionally, after the pop-up window 301 is no longer displayed at the top of the screen of the terminal, the prompt information in the pop-up window 301 may be displayed in the notification bar. When the user opens the notification bar, the user may see the prompt information. Herein, for a style of the notification bar, refer to FIG. 3c and related description.

According to the methods shown in the embodiments of FIG. 3a to FIG. 3c and FIG. 4A and FIG. 4B, the terminal may notify the user of the current health status of the battery.

It may be understood that, not limited to the manner of notifying the user of the current health status of the battery by using the pop-up window 301 at the top of the screen shown in FIG. 3a, in this application, the user may be further notified in another manner. For example, in some possible embodiments, the terminal may further display the pop-up window in the middle of the screen, and the pop-up window may include information that notifies the user of the current health status of the battery. Further, the pop-up window displayed in the middle of the screen may further include the switch for enabling/disabling the battery protection mode, and the user may directly enable the battery protection mode by using the switch in the pop-up window. Not limited to the prompt information on the screen, the terminal may further notify the user of the current health status of the battery in a manner of signal light blinking, a prompt tone, or the like. This is not limited in this application.

In some embodiments, after learning of the current health status of the battery by using the prompt of the terminal, the user may further enable the battery protection mode based on a requirement. Specifically, the user may enable the battery protection mode on the battery setting interface shown in the accompanying drawing on the right side of FIG. 2A and FIG. 2B. Herein, the battery setting interface may be displayed by the terminal in response to the tap operation performed by the user on the battery option 401 in the accompanying drawing on the left side of FIG. 2A and FIG. 2B, or may be displayed by the terminal in response to the tap operation performed by the user on the pop-up window 301 at the top of the screen in FIG. 3a, or may be displayed by the terminal in response to the tap operation performed by the user on the prompt information 302 in the notification bar in FIG. 3c.

After the user enables the battery protection mode, the terminal takes the specific measure to reduce the expansion rate of the battery and prolong the lifespan of the battery. Herein, the measure taken by the terminal may be any one of the following measures:

(a) Taking the restrictive measure based on the overall expansion parameter of the terminal battery.

Herein, once the battery is put into use, the terminal starts to continuously record the overall usage of the battery. In some embodiments, the terminal may obtain the overall expansion parameter of the battery based on the overall usage of the battery. Herein, the overall usage that is of the battery and that is recorded by the terminal, how the terminal obtains the overall expansion parameter of the battery, and the restrictive measure taken by the terminal are the same as those in the embodiment of FIG. 2A and FIG. 2B, and reference may be made to related descriptions.

(b) Taking the restrictive measure based on the recent expansion parameter of the terminal battery.

Herein, the terminal starts to monitor the recent expansion parameter of the battery when the battery is initially put into use. Herein, once the battery is put into use, the terminal starts to continuously record the recent usage of the battery. In some embodiments, the terminal may obtain the recent expansion parameter of the battery based on the recent usage of the battery. Herein, the recent usage that is of the battery and that is recorded by the terminal, how the terminal obtains the recent expansion parameter of the battery, and the restrictive measure taken by the terminal are the same as those in the embodiment of FIG. 2A and FIG. 2B, and reference may be made to related descriptions.

The recent expansion parameter of the terminal battery is related to a specific condition of the battery at a current use stage. Therefore, in a use process of the battery, the recent expansion parameter of the battery may reach the threshold for a plurality of times. Therefore, in the scenario (1), the terminal may notify the user of the current health status of the battery each time when the recent expansion parameter of the battery reaches the threshold.

In some embodiments of this application, the terminal may continuously monitor the overall/recent usage of the battery, to obtain the overall/recent expansion parameter of the battery, and directly enable the battery protection mode for the terminal when the overall/recent expansion parameter of the battery reaches the threshold. Herein, the threshold is the same as the threshold in the scenario (1), and reference may be made to related description.

In other words, when the overall/recent expansion parameter of the battery reaches the threshold, the terminal directly takes the specific measure to reduce the expansion rate of the battery and prolong the lifespan of the battery. Herein, the terminal may take the restrictive measure based on the overall expansion parameter of the terminal battery, or may take the restrictive measure based on the recent expansion parameter of the terminal battery.

Figure 5:
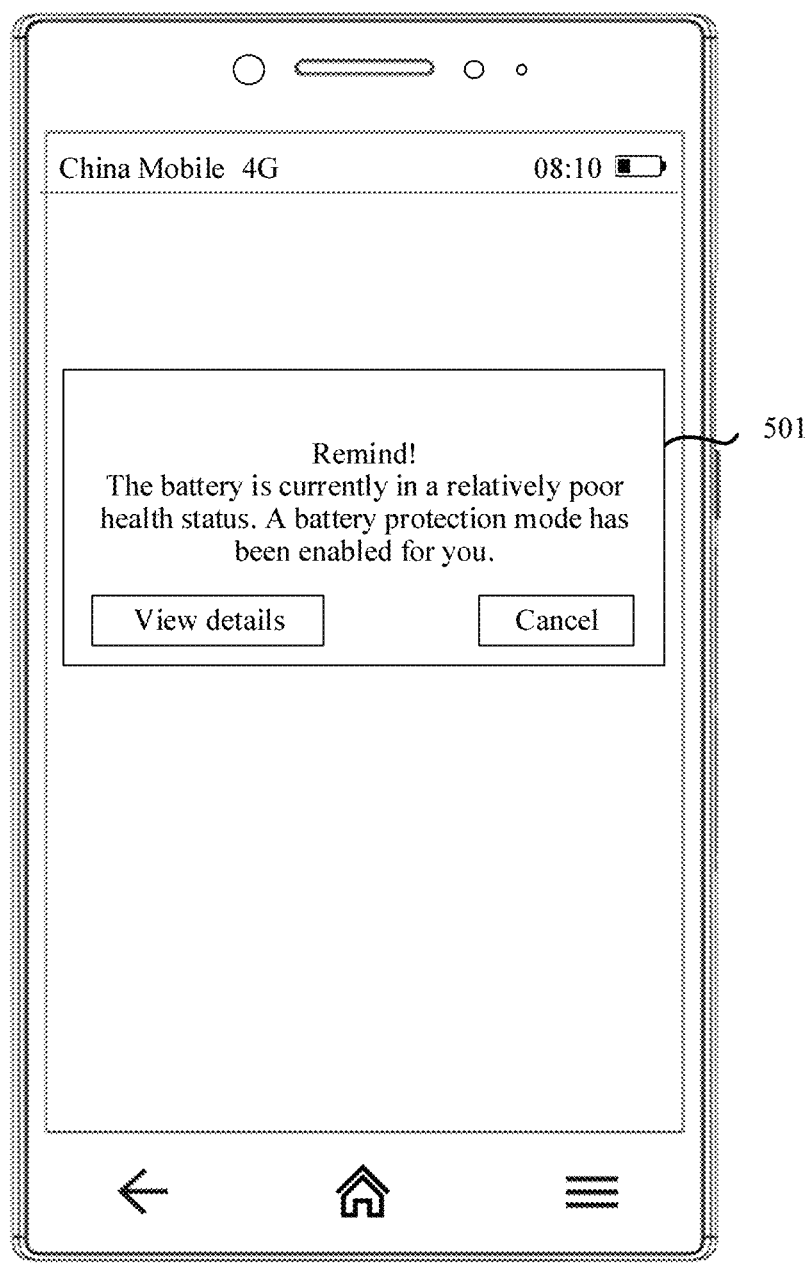

Further, after enabling the battery protection mode for the terminal, the terminal may notify the user that the battery protection mode has been enabled. For example, referring to FIG. 5, the terminal may notify, in a form of a floating window 501 on the interface content currently output by the system, the user that the battery protection mode is enabled for the user. In some embodiments, the floating window 501 may further include a "view details" option and a "cancel" option. The user may tap the "view details" option to enter the accompanying drawing on the right side shown in FIG. 2A and FIG. 2B (the switch 202 is turned on), to view the brief description of the battery protection mode, so as to understand the battery protection mode. In some embodiments, the user may further tap the "cancel" option to close the floating window 501. Herein, not limited to the floating window 501 shown in FIG. 5, the terminal may further notify, in the manner of displaying the prompt information in the pop-up window at the top of the screen or in the notification bar, signal light blinking, the prompt tone, or the like, the user that the battery protection mode has been enabled.

Because an expansion process of the battery is almost irreversible, after a period of time, the battery is still in a relatively late stage of a life cycle. The relatively late stage of the life cycle of the battery means that the battery, namely, remaining available duration of the battery, is relatively short. Herein, that the battery is available means that the battery can convert chemical energy into electric energy. When the battery cannot convert chemical energy into electric energy, the battery is unavailable. In some embodiments of this application, when the battery is in the relatively late stage of the life cycle, the terminal may notify the user of replacing the battery.

In an optional embodiment, when the overall expansion parameter of the battery is greater than a second critical value, the terminal may determine that the battery is in the relatively late stage of the life cycle. Herein, the second critical value may be preset by a research and development person based on an experiment. Second critical values corresponding to batteries of different models may be the same or may be different.

Figure 6A:
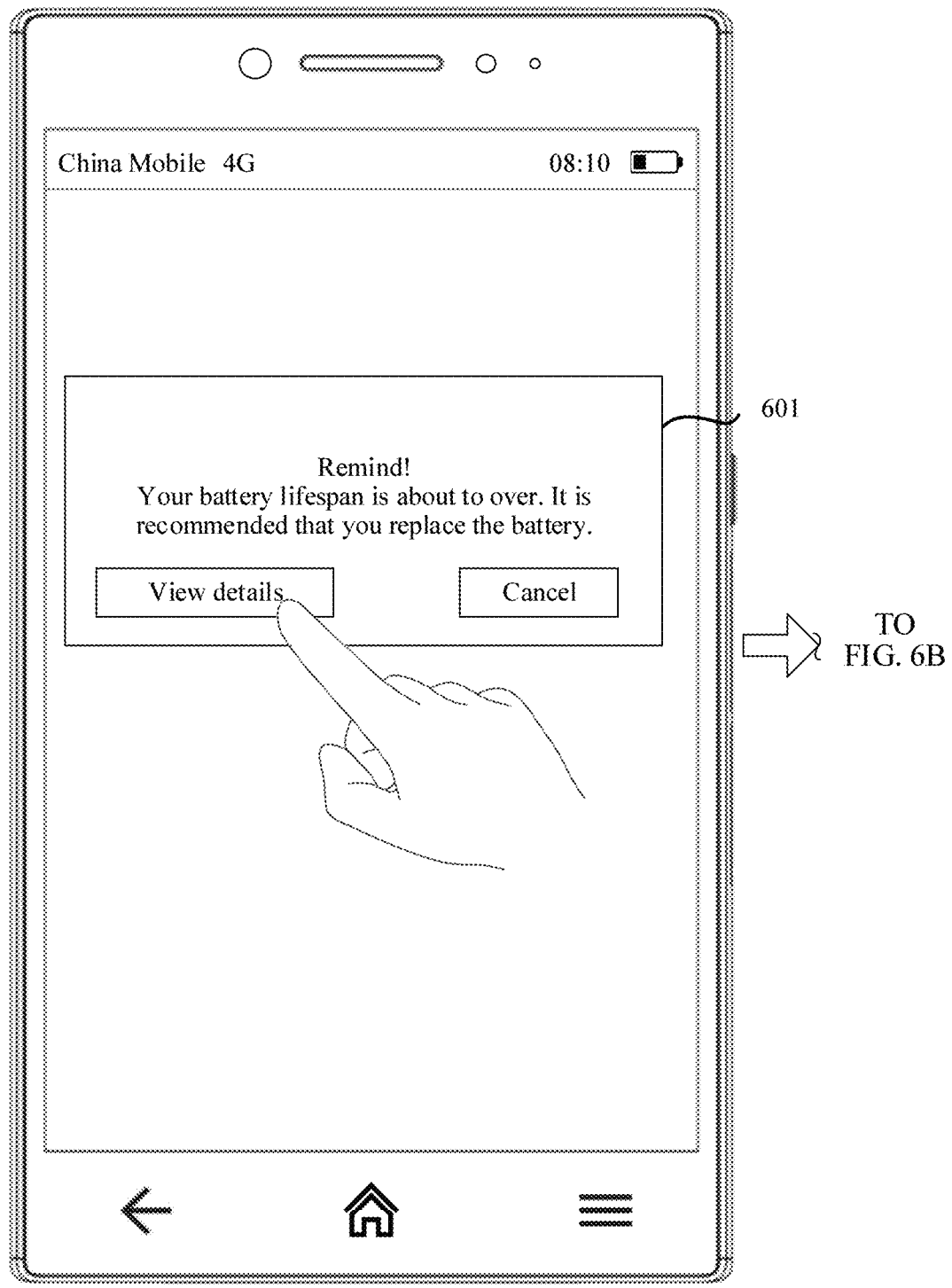
Figure 6B:
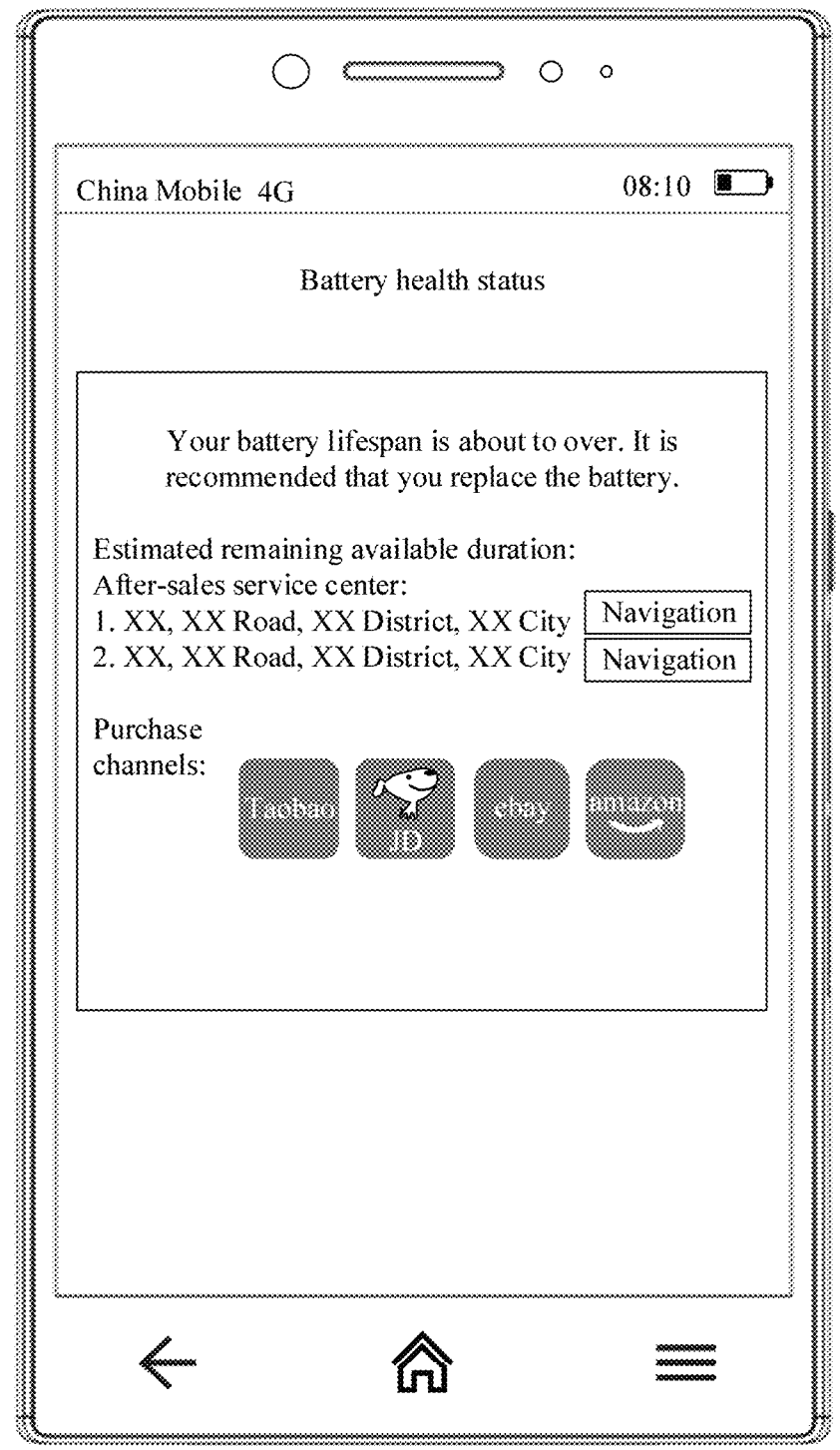

For example, the accompanying drawing on the left side of FIG. 6A and FIG. 6B shows a possible manner in which the terminal notifies the user of replacing the battery. As shown in the accompanying drawing on the left side of FIG. 6A and FIG. 6B, the terminal may notify, in a form of a floating window 601 on the interface content currently output by the system, the user of replacing the battery. In the floating window 601 shown in the accompanying drawing on the left side of FIG. 6A and FIG. 6B, the lifespan of the battery refers to the remaining available duration of the battery, and that the lifespan of the battery is almost over refers to that the remaining available duration of the battery is relatively short.

In some embodiments, the floating window 601 may further include a "view details" option and a "cancel" option. The user may tap the "cancel" option to close the floating window 601. In some embodiments, the user may further tap the "view details" option, and in response to the tap operation, the terminal displays an interface shown in the accompanying drawing on the right side of FIG. 6A and FIG. 6B. Herein, not limited to the floating window 601 in the accompanying drawing on the left side of FIG. 6A and FIG. 6B, the terminal may further notify, in the manner of displaying the prompt information in the pop-up window at the top of the screen or in the notification bar, the user of replacing the battery.

Referring to the accompanying drawing on the right side of FIG. 6A and FIG. 6B, the display interface in the figure reflects a health status when the battery is in the relatively late stage of the life cycle. In some possible implementations, the interface may further include one or more of the following: estimated remaining available duration of the battery, an after-sales service center address of the terminal, a battery purchase channel, and the like. The estimated remaining available duration of the battery may be obtained by the terminal through estimation after the terminal estimates the overall expansion thickness of the battery based on the overall expansion parameter of the battery.

In some embodiments, when displaying the after-sales service center address, the terminal may further include a "navigation" option. When the "navigation" option receives a tap operation of the user, the screen of the terminal may start a navigation application (for example, Google Maps or AutoNavi Maps), and display, in the navigation application, a navigation route from a current location to the after-sales service center address.

In some embodiments, the battery purchase channel may include an icon (for example, Taobao, JD, or eBay) of an e-commerce application installed on the terminal. When an icon receives a tap operation of the user, the terminal may start an e-commerce application corresponding to the icon, and the user may search for and purchase a battery in the e-commerce application.

Not limited to interface elements shown in the accompanying drawing on the right side of FIG. 6A and FIG. 6B, in specific implementation, the interface used by the terminal to notify the user of the health status of the battery at the late stage may further include more information, for example, a specific model of the battery configured for the terminal.

The embodiments of FIG. 2A to FIG. 6B describe in detail the human-computer interaction embodiments of this application. To better understand the charging management method provided in this application, the following briefly describes causes of battery expansion.

Impact factors of the battery expansion may mainly include the battery voltage, the battery temperature, duration of the battery at a voltage and a temperature, a charging current of the battery, and the like. The following first describes impact of each impact factor on the battery expansion.

A higher temperature indicates a faster speed at which carbon dioxide gas is generated inside the battery due to oxidation reaction, namely, a faster expansion rate of the battery. The high-temperature state of the battery may be mainly caused by the following cases: An ambient temperature at which the terminal is currently located is excessively high, power consumption of the terminal is excessively high, or the terminal is being charged. Generally, the high temperature state of the battery cannot be automatically adjusted by the terminal.

The battery voltage refers to a difference between an electrode potential of a positive electrode and an electrode potential of a negative electrode, and is related to a current migration amount of conductive particles between the positive electrode and the negative electrode of the battery. A lithium-ion battery is used as an example for description. A voltage of the lithium-ion battery is related to a quantity of active lithium ions (namely, lithium ions that can move between the positive electrode and the negative electrode of the battery). Specifically, when the lithium-ion battery is charged, the active lithium ion is transferred from the positive electrode of the battery and embedded into the negative electrode of the battery. More lithium ions embedded into the negative electrode indicate a higher charging capacity, and a voltage between the positive electrode and the negative electrode of the battery gradually increases. After charging ends, the voltage between the positive electrode and the negative electrode of the battery is a fully charged battery voltage. In other words, the battery voltage reflects a volume of electricity actually stored in the battery. Herein, a unit of the electricity stored in the battery may be mA/hour (mA/h).

When the battery is in a high-voltage state, a speed at which an electrolyte inside the battery is decomposed to generate carbon dioxide gas is increased, in other words, the expansion rate of the battery is increased. Herein, that the battery is in a high-voltage state means that the battery voltage is close to or equal to a maximum design voltage in a battery specification. In other words, when an actual voltage of the battery is close to or equal to the maximum design voltage, it may be considered that the battery is in the high-voltage state. Herein, the maximum design voltage is determined by a manufacturing process and a material of the battery, and a maximum safety voltage that can be reached in theory when the battery is charged is a limited charging voltage. Therefore, batteries of different models may have different maximum design voltages. Therefore, each battery may have a different high-voltage state. For example, a maximum design voltage of a battery 1 is 4.4 V, and a maximum design voltage of a battery 2 is 4.2 V. In this case, for the battery 1, when a battery voltage is close to 4.4 V, the battery 1 is in the high-voltage state; and for the battery 2, when a battery voltage is close to 4.2 V, the battery 2 is in the high-voltage state.

To protect the battery, a charging architecture of a device limits the charging cutoff voltage of the battery. Generally, the charging cutoff voltage is less than or equal to the maximum design voltage of the battery. When the battery is charged, and when the battery voltage reaches the charging cutoff voltage but does not reach the maximum design voltage, a charging circuit of the device starts to gradually reduce the charging current, to be specific, slowly ends charging. To be specific, the charging cutoff voltage is the actual maximum value that can be reached by the battery voltage when the battery is charged.

When the battery is in the high-voltage state for a long time, the expansion rate of the battery is accelerated. That the battery is in the high voltage state for a long time may include the following case: The terminal is in a floating charge state. Here, floating charge refers to that a charger of the terminal is in location for a long time, to be specific, the terminal is connected to the power supply by using the charger for a long time. During floating charge, the battery voltage of the terminal is always close to or equal to the charging cutoff voltage. Because the charging cutoff voltage is close to or equal to the maximum design voltage of the battery, the battery is in the high-voltage state for a long time during floating charge.

A larger charging current indicates a larger temperature rise of the device and the battery, in other words, the expansion rate of the battery is increased. During battery charging, an actual charging current is slightly less than the maximum charging current. Therefore, limiting the maximum charging current of the battery can also reduce the expansion rate of the battery.

The battery is a complex electrochemical system, and the health status of the battery is closely related to factors such as the manufacturing process, an internal active substance, an electrode material, and a running environment. Most batteries used currently are sealed, and only surface data can be collected because internal conditions of the batteries cannot be obtained, for example, a cell voltage, a string current, an equalization current, a cell temperature, and an ambient temperature. Generally, only the data can be used to estimate a battery status and determine the health status of the battery.

In this application, an expansion thickness of the battery is mainly estimated by using a working parameter of the battery, to control charging of the battery. The expansion rate of the battery is reduced by reducing the charging cutoff voltage of the battery and/or reducing the maximum charging current of the battery during charging. The charging cutoff voltage of the battery is reduced, so that the actual maximum value that can be reached when the battery voltage is charged can be reduced, and duration of the battery in the high-voltage state is relatively reduced, to slow down battery expansion.

The following describes two possible methods for reducing the expansion rate of the battery.

(1) Reducing the expansion rate of the battery based on the overall expansion parameter of the battery.

The overall expansion parameter of the battery may reflect the overall expansion thickness of the battery. Specifically, the overall expansion thickness of the battery refers to the thickness increased from the time when the battery is put into use to the current time. Herein, the thickness of the battery is the maximum distance between the front surface and the rear surface of the battery. Herein, the use may include any one of the following cases: the battery is delivered from the factory, the battery is powered for the first time, the battery is charged for the first time, and the like.

The following describes in detail a method for obtaining the overall expansion parameter of the battery by the terminal.

In a first method, the terminal may continuously record actual usage of the battery from the time when the battery is put into use to the current time. The usage includes the duration of the battery in each temperature range and each voltage range.

Table 2 shows usage that is of a battery whose battery model is "ATL GC-SDC-356585-010L 1S1P 3.82V 3240 mAh Li-ion" and that is recorded by a terminal in one day. ATL is a manufacturer of an electrochemical cell of the battery, GC-SDC-356585-010L is an electrochemical cell model, 3.82 V is a rated voltage (which may also be referred to as a nominal voltage (nominal voltage)) of the battery, 3240 mAh is a rated capacity (which may also be referred to as a nominal capacity (nominal capacity)) of the battery, and Li-ion indicates that the battery is a lithium-ion battery. The battery moves between a positive electrode and a negative electrode by using the lithium ion for working. Herein, when the battery is charged, a battery voltage can fluctuate around the rated voltage. For example, when the rated voltage is 3.82 V, the battery voltage during charging may be in a range of 3.2 V to 4.4 V.

TABLE 2

Statistical table of usage duration of the terminal battery in one day

| Temperature (T) | Voltage (V) | | | | | |
|---|---|---|---|---|---|---|
| | V < 4.2 | 4.2 ≤ V < 4.25 | 4.25 ≤ V < 4.3 | 4.3 ≤ V < 4.35 | 4.35 ≤ V < 4.4 | V ≥ 4.4 |
| T < 35 | 40395 | 536 | 0 | 0 | 0 | 0 |
| 35 ≤ T < 38 | 16753 | 762 | 656 | 200 | 247 | 0 |
| 38 ≤ T < 40 | 16454 | 125 | 15 | 0 | 0 | 0 |
| 40 ≤ T < 42 | 8227 | 55 | 0 | 0 | 0 | 0 |
| 42 ≤ T < 45 | 495 | 0 | 0 | 0 | 0 | 0 |
| T ≥ 45 | 5 | 0 | 0 | 0 | 0 | 0 |

Table 2 records the usage of the battery in one day when the user uses the terminal. Optionally, in Table 2, a unit of the temperature (T) is degree Celsius, a unit of the voltage (V) is volt, and a unit of the duration is second (s). For example, referring to the second column of the second row in Table 2, duration in which the terminal has, in one day, a battery voltage less than 4.2 volts and a battery temperature less than 35 degrees Celsius is 40395 s in total.

Herein, the terminal may continuously record usage of the battery. For example, the terminal may continuously record usage of the battery for one week, one month, or one year, and accumulate newly obtained data and original data in Table 2, to obtain the usage of the battery for one week, one month, or one year. In such a continuous recording manner, if the terminal starts to record the usage of the battery when the battery is put into use, the overall usage of the battery from the time when the battery is put into use to the current time may be obtained.

Table 2 is merely an example. In specific implementation, when recording the usage of the battery, the terminal may divide more voltage ranges and temperature ranges, and critical values of each voltage range and each temperature range may be different from those in Table 2. Not limited to a form of the table shown in Table 2, in specific implementation, the terminal may further record the usage of the battery in another form, for example, a text or a graph. This is not limited in this application.

It may be understood that the usage of the terminal battery records an actual usage status of the battery, and battery usage corresponding to different terminals or different users may be different.

In this application, the terminal may store an expansion coefficient of the used battery, or may obtain an expansion coefficient of the used battery by using a network. The expansion coefficient reflects the expansion rate of the battery. Table 3 is an expansion coefficient table obtained through measurement by using the battery whose model is "ATL GC-SDC-356585-010L 1S1P 3.82V 3240 mAh Li-ion".

TABLE 3

Expansion coefficient table of the terminal battery

| Temperature (T) | Voltage (V) | | | | | |
|---|---|---|---|---|---|---|
| | V < 4.2 | 4.2 ≤ V < 4.25 | 4.25 ≤ V < 4.3 | 4.3 ≤ V < 4.35 | 4.35 ≤ V < 4.4 | V ≥ 4.4 |
| T < 35 | 0.001 | 0.002 | 0.006 | 0.010 | 0.012 | 0.009 |
| 35 ≤ T < 38 | 0.002 | 0.004 | 0.010 | 0.017 | 0.021 | 0.021 |
| 38 ≤ T < 40 | 0.003 | 0.006 | 0.017 | 0.030 | 0.035 | 0.036 |
| 40 ≤ T < 42 | 0.005 | 0.010 | 0.029 | 0.051 | 0.060 | 0.062 |
| 42 ≤ T < 45 | 0.007 | 0.013 | 0.035 | 0.066 | 0.081 | 0.084 |
| T ≥ 45 | 0.007 | 0.015 | 0.033 | 0.075 | 0.230 | 0.234 |

Optionally, in Table 3, a unit of the temperature (T) is degree Celsius, a unit of the voltage (V) is volt, and a unit of the defined expansion coefficient may be 1/day. The expansion coefficient may represent a reciprocal of a quantity of days required by the battery to expand a first thickness in a corresponding temperature range and voltage range. A larger expansion coefficient indicates a faster expansion rate of the battery in a corresponding temperature range and voltage range. For example, if the first thickness is 6% of an original thickness of the battery, the expansion coefficient in Table 3 represents a reciprocal of a quantity of days required for increasing a thickness of the battery by 6% of the original thickness in a corresponding temperature range and voltage range. For example, referring to the sixth column of the third row in Table 3, when the battery voltage of the terminal is 4.35 volts≤V<4.4 volts, and the battery temperature is 35 degrees Celsius≤T<38 degrees Celsius, the thickness of the battery increases by 6% of the original thickness, a required quantity of days is 47.6, and a corresponding expansion coefficient is set to 0.021. The original thickness of the battery may be a thickness obtained after manufacturing of the battery is completed.

In an optional implementation, the first thickness may be a maximum allowable expansion thickness determined by battery performance. After the expansion thickness of the battery exceeds the maximum allowable expansion thickness, explosion, spill, or another danger may occur. In another optional implementation, the first thickness may be an expansion thickness reserved by the terminal for the battery. After the expansion thickness of the battery exceeds the reserved expansion thickness, the terminal is damaged (for example, a housing is pushed out by the battery).

Table 3 is merely an example. In specific implementation, more voltage ranges and temperature ranges may be obtained through division in the expansion coefficient table of the battery, and critical values of each voltage range and each temperature range may be different from those in Table 3. Not limited to a form of the table shown in Table 3, in specific implementation, the terminal may further store the expansion coefficient of the battery in another form, for example, a text or a graph. This is not limited in this application.

It may be understood that after the battery is manufactured, expansion coefficients (including a plurality of expansion coefficients in different voltage ranges and temperature ranges) of the battery are fixed. To be specific, the expansion coefficient is an attribute of the battery, and does not change with an external factor. The expansion coefficient of the battery is related to a manufacturing process of the battery, and factors that affect the expansion coefficient of the battery include a battery model. The expansion coefficient varies with the battery model. The battery model includes at least one of the following: the rated voltage of the battery, a charging voltage, a rated capacity, a typical capacity, an internal resistance of the battery, a delivery voltage, a battery weight, a cycle life, a standard charging current, the maximum charging current, a standard discharging current, a maximum discharging current, a discharging cutoff voltage, electrostatic test data, a manufacturer of an electrochemical cell, a model of the electrochemical cell, a nominal capacity of the electrochemical cell, and a typical capacity of the electrochemical cell.

In a possible implementation, the expansion coefficient of the battery may be obtained by the research and development person by using an experimental test. Specifically, the research and development person may place the battery into a voltage range and a temperature range, and record time required for increasing the thickness of the battery by the first thickness, to obtain the expansion coefficient of the battery. In this way, an expansion coefficient of the battery in each voltage range and temperature range may be obtained. It may be understood that the research and development person may separately obtain expansion coefficients of batteries of different models.

Based on the overall usage that is of the battery and that is recorded by the terminal from the time when the battery is put into use to the current time and the expansion coefficient of the battery, the terminal may obtain the overall expansion parameter of the battery.

In some embodiments, the terminal may obtain the overall expansion parameter of the battery in the weighting calculation manner, and the overall expansion thickness of the battery may be reflected by using the overall expansion parameter of the battery. Referring to the formula 1, A is the overall expansion parameter of the terminal battery from the time when the terminal battery is put into use to the current time, $T_i$ is an $i^{th}$ temperature range, $V_j$ is a $i^{th}$ voltage range, $t(T_i, V_j)$ is duration from the time when the terminal is put into use to the current time when a battery temperature is $T_i$ and a battery voltage is $V_j$, and $a(T_i, V_j)$ is an expansion coefficient when the terminal battery temperature is $T_i$ and the terminal battery voltage is $V_j$. Optionally, A is a unitless parameter, a unit of $t(T_i, V_j)$ is s, and a unit of $a(T_i, V_j)$ is 1/day. $1 \leq i \leq n$, $1 \leq j \leq m$, i and j are positive integers, n is a total quantity of divided temperature ranges, and m is a total quantity of divided voltage ranges.

$$A = \Sigma_{j=1}^{m} \Sigma_{i=1}^{n} (t(T_i, V_j) \times a(T_i, V_j)) \quad \text{formula 1}$$

Specifically, for example, the battery whose model is "ATL GC-SDC-356585-010L 1S1P 3.82V 3240 mAh Li-ion" is configured for the terminal. It is assumed that usage time from the time when the battery is put into use to the current time is one year, and daily usage is shown in Table 2, the expansion coefficient of the battery is shown in Table 3. According to formula 1, an expansion parameter A after the battery is used for one year can be calculated, and $A = (40395 \times 0.001 + 536 \times 0.002 + 16753 \times 0.002 + \ldots + 8227 \times 0.005 + 55 \times 0.010 + 495 \times 0.007)/(24 \times 3600) \times 365 = 0.584$.

It may be understood that a larger value of A indicates a thicker overall expansion thickness of the battery. For example, when the value of A is 0, it indicates that the overall expansion thickness of the battery is 0. When the value of A reaches 1, it indicates that the overall expansion thickness of the battery reaches the first thickness.

In a possible implementation, the terminal may periodically calculate the overall expansion parameter of the battery, for example, calculate the overall expansion parameter daily, weekly, or monthly.

After obtaining the overall expansion parameter of the battery from the time when the battery is put into use to the current time, the terminal may reduce the expansion rate of the battery according to a specific policy. In some embodiments of this application, the policy may include: The terminal performs the corresponding restrictive measure based on the overall expansion parameter of the battery. Further, a plurality of expansion parameter ranges are obtained through division, and each expansion parameter range corresponds to a restrictive measure. The terminal may determine a range of the overall expansion parameter from the time when the battery is put into use to the current time, and execute a restrictive measure corresponding to the range.

The plurality of expansion parameter ranges is set according to a gradient. In some embodiments, the plurality of expansion parameter ranges fall within 0 to 1.

In this application, a larger overall expansion parameter A of the battery indicates a thicker overall expansion thickness of the battery and a poorer actual status of the battery. A restrictive measure with a greater strength may be used to reduce the expansion rate of the battery. To be specific, a larger value in the expansion parameter range indicates a stronger corresponding restrictive measure.

In this application, the restrictive measure may be classified into the following three types:

(1) reducing the battery charging cutoff voltage;

(2) reducing the maximum charging current of the battery; and (3) reducing the charging cutoff voltage and maximum charging current of the battery.

It may be understood that, reducing the charging cutoff voltage of the battery reduces the run time of the battery, and reducing the maximum charging current of the battery prolongs charging time of the battery.

Each type of restrictive measure may be subdivided into different strengths. For example, in the restrictive measure (1), a larger decrease in the charging cutoff voltage of the battery indicates a greater strength. When the charging cutoff voltage reduces to 0, the battery cannot be charged. In this case, the strength is the greatest. For another example, in the restrictive measure (2), a larger decrease in the maximum charging current of the battery indicates a greater strength. When the maximum charging current reduces to 0, the battery cannot be charged. In this case, the strength is the greatest.

Table 4 shows several possible overall expansion parameter ranges and corresponding restrictive measures. The restrictive measures shown in Table 4 belong to the type (1), in other words, the terminal reduces the expansion rate of the battery by reducing the charging cutoff voltage.

TABLE 4

Restrictive measures corresponding to expansion parameter ranges

| Expansion parameter range | Restrictive measure |
|---|---|
| 0 ≤ A < 0.7 | None |
| 0.7 ≤ A < 0.8 | Charging cutoff voltage = initial charging cutoff voltage − 50 mV |
| 0.8 ≤ A < 0.85 | Charging cutoff voltage = initial charging cutoff voltage − 100 mV |
| 0.85 ≤ A < 0.9 | Charging cutoff voltage = initial charging cutoff voltage − 200 mV |
| 0.9 ≤ A < 1 | Charging cutoff voltage = 0 V |

Figure 7:
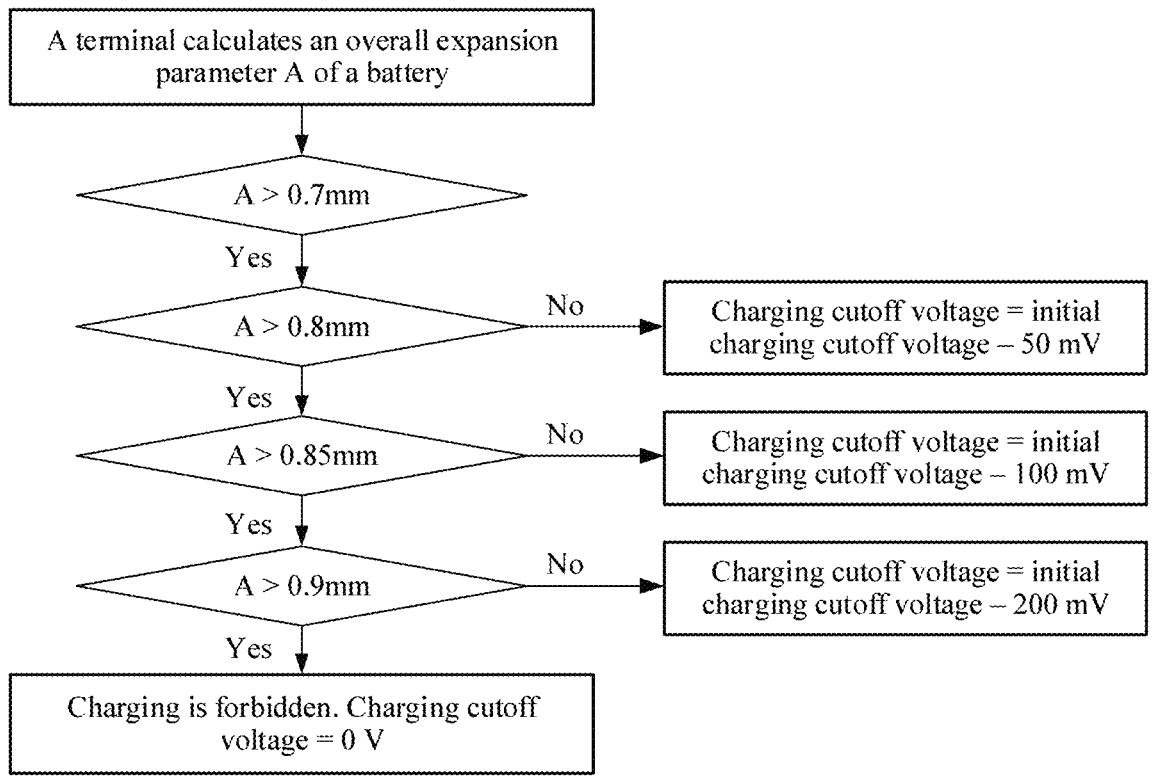
FIG. 7 is a schematic flowchart of executing a restrictive measure based on an overall expansion parameter of a terminal battery according to this application.

FIG. 7 is a schematic flowchart in which the terminal reduces the expansion rate of the battery by using the first method, in other words, based on the overall expansion parameter of the battery. Expansion parameter ranges obtained through division and respectively corresponding restrictive measures in FIG. 7 are shown in Table 3.

Figure 8:
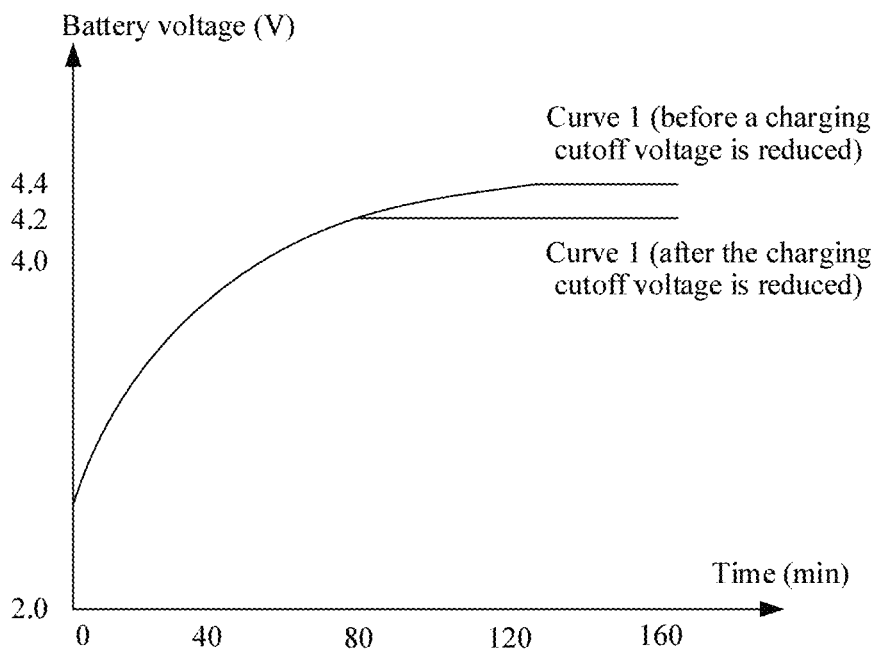
FIG. 8 is a schematic diagram of charging according to this application.

Herein, after the charging cutoff voltage is reduced, time required for charging the battery to a maximum voltage that can be actually reached is shortened. For example, FIG. 8 is a schematic diagram of time and battery voltages during battery charging before and after the charging cutoff voltage is reduced. As shown in FIG. 8, a curve 1 is a schematic diagram of charging when the initial charging cutoff voltage of the battery is 4.4 V. A curve 2 is a schematic diagram of charging when the charging cutoff voltage of the battery is reduced by 200 mV based on the initial charging cutoff voltage, namely, a schematic diagram of charging when the charging cutoff voltage of the battery is reduced to 4.2 V.

It can be learned from Table 4 and FIG. 7 that the overall expansion parameter of the terminal battery has two critical values, and the two critical values may be referred to as a first critical value (for example, 0.7 in Table 4) and a second critical value (for example, 0.9 in Table 4). When the overall expansion parameter of the battery is less than the first critical value, the terminal does not take a restrictive measure. When the overall expansion parameter of the battery exceeds the second critical value, the terminal takes a restrictive measure with a maximum strength. Herein, the first critical value may be the first critical value in the scenario (1) in the embodiment of FIG. 3a to FIG. 3c. To be specific, when the overall expansion parameter of the battery reaches the first critical value, the terminal may notify the user of the current health status of the battery. Herein, the second critical value may be the second critical value in the embodiment of FIG. 6A and FIG. 6B. To be specific, when the overall expansion parameter of the battery reaches the second critical value, the terminal may determine that the battery is in the relatively late stage of the life cycle, and notify the user of replacing the battery.

After the restrictive measure is taken, the run time of the battery is reduced or the charging time of the battery is prolonged. When the overall expansion parameter of the battery is less than the first critical value, no restrictive measure is taken (to be specific, the charging cutoff voltage or the maximum charging current of the battery is not reduced), so that use experience of the user can be ensured. When the overall expansion parameter of the battery exceeds the second critical value, the terminal takes the restrictive measure with the maximum strength, to prevent the battery from explosion, spill, or the like. This ensures user safety.

Herein, the first critical value and the second critical value may be preset. For example, an appropriate first critical value and an appropriate second critical value may be obtained by the research and development person through an experiment. It may be understood that first critical values and second critical values corresponding to batteries of different models may be different, or may be the same. This is not limited herein.

In some embodiments, the restrictive measure corresponding to the expansion parameter range means that when an actual expansion parameter of the terminal falls within the expansion parameter range, a subsequent expansion rate of the terminal battery can be relatively optimally reduced by using the corresponding restrictive measure without affecting the use experience of the user. Herein, the restrictive measure corresponding to each expansion parameter range may be determined by the research and development person through an experiment. It may be understood that for batteries of different models, restrictive measures corresponding to expansion parameter ranges may be the same, or may be different. This is not limited in this application.

In some embodiments, the restrictive measures corresponding to the expansion parameter ranges not only may belong to a same type, but also may belong to different types. To be specific, restrictive measures of different types may be implemented in a cross-combination manner.

In the method (1), the terminal records the duration of the battery in each temperature range and each voltage range in the use process, to calculate the overall expansion parameter of the battery. Because the overall expansion parameter of the battery reflects the overall expansion thickness of the battery, the corresponding restrictive measure is taken based on the overall expansion parameter of the battery, so that the expansion rate of the battery can be reduced, and the lifespan of the battery can be prolonged.

In addition, when a life cycle of the battery is about to over, in other words, when the battery expansion parameter reaches the second critical value, the terminal may execute the restrictive measure with the maximum strength, to prevent the user from charging. This can prevent the battery from explosion, spill, or the like, and ensures user safety.

(2) Reducing the expansion rate of the battery based on the recent expansion parameter of the battery.

The recent expansion parameter of the battery may reflect the recent expansion thickness of the battery. Specifically, the recent expansion thickness of the battery refers to a thickness of the battery increased in a recent period of time. The recent period of time may be a recent day, a recent week, recent 10 days, a recent month, or the like. In an optional embodiment, the recent period of time may be independently determined by the terminal, or may be set by the user.

A method for obtaining the recent expansion parameter of the battery by the terminal is similar to the method for obtaining the overall expansion parameter of the battery by the terminal. The method for obtaining the recent expansion parameter of the battery by the terminal is described in detail in the following.

In a second method, the terminal may record recent actual usage of the battery, and the usage includes duration of the battery in each recent temperature range and each recent voltage range. Table 5 shows usage that is of the battery whose battery model is "ATL GC-SDC-356585-010L 1S1P 3.82V 3240 mAh Li-ion" and that is recorded by the terminal in one day.

TABLE 5

Statistical table of usage duration of the terminal battery in one day

| | Voltage (V) | | | | | |
|---|---|---|---|---|---|---|
| Temperature (T) | V < 4.2 | 4.2 ≤ V < 4.25 | 4.25 ≤ V < 4.3 | 4.3 ≤ V < 4.35 | 4.35 ≤ V < 4.4 | V ≥ 4.4 |
| T < 35 | 9915 | 4158 | 7435 | 4944 | 16829 | 0 |
| 35 ≤ T < 38 | 0 | 0 | 10 | 11164 | 6398 | 0 |
| 38 ≤ T < 40 | 0 | 0 | 0 | 66 | 4892 | 0 |
| 40 ≤ T < 42 | 0 | 0 | 12 | 220 | 5428 | 0 |
| 42 ≤ T < 45 | 0 | 0 | 22 | 8280 | 6598 | 0 |
| T ≥ 45 | 0 | 0 | 0 | 0 | 0 | 0 |

Table 5 records the usage of the battery terminal in one day. The terminal is in a high-temperature floating charge state for most of the time of the day. A unit of the temperature (T) is degree Celsius, a unit of the voltage (V) is volt, and a unit of the duration is second (s).

Herein, the terminal may continuously record the recent usage of the battery. For example, after recording usage of the terminal in the first day, the terminal continuously records usage of the battery in the second day, and replaces data of the first day with data of the second day to obtain usage of the battery on a last day. In such a continuous recording manner, the terminal may obtain the recent usage of the battery.

Same as that in the first method, the terminal may store an expansion coefficient of the used battery, and the expansion coefficient reflects the expansion rate of the battery. For the expansion coefficient of the battery, refer to Table 3 and related description. Details are not described herein again.

Based on the recent actual usage that is of the battery and that is recorded by the terminal and the expansion coefficient that is of the battery and that is stored in the terminal, the terminal may obtain the recent expansion parameter of the battery.

In some embodiments, the terminal may obtain the recent expansion parameter of the battery in the weighting calculation manner. In the formula 2, B is the recent expansion parameter of the terminal battery, $T_i$ is an $i^{th}$ temperature range, $V_j$ is a $j^{th}$ voltage range, $t'(T_i, V_j)$ is duration when a recent terminal temperature is $T_i$ and a recent terminal voltage is $V_j$, and $a'(T_i, V_j)$ is an expansion coefficient when the terminal battery temperature is $T_i$ and the terminal battery voltage is $V_j$. Optionally, B is a unitless parameter, a unit of $t'(T_i, V_j)$ is s, and a unit of $a'(T_i, V_j)$ is 1/day. 1≤i≤n, 1≤j≤m, i and j are positive integers, n is a total quantity of divided temperature ranges, and m is a total quantity of divided voltage ranges.

$$B=\Sigma_{j=1}^{m}\Sigma_{i=1}^{n}(t'(T_i,V_j)\times a'(T_i,V_j)) \qquad \text{formula 2}$$

Specifically, for example, the terminal uses the battery whose model is "ATL GC-SDC-356585-010L 1S1P 3.82V 3240 mAh Li-ion". Usage of the battery in a late day is shown in Table 5, and the expansion coefficient of the battery is shown in Table 3. According to the formula 2, an expansion parameter B of the battery in the last day can be calculated, and B=(9915×0.001+4158×0.002+7435×0.006+ . . . +22×0.035+8280×0.066+6598×0.081)/(24×3600)×365=0.0164.

It may be understood that a larger value of B indicates a thicker recent expansion thickness of the battery. For example, when the value of A is 0, it indicates that the recent expansion thickness of the battery is 0. When the value of A reaches 1, it indicates that the recent expansion thickness of the battery reaches the first thickness.

In a possible implementation, the terminal may periodically calculate the recent expansion parameter of the battery, for example, calculate the recent expansion parameter every one or two days.

After obtaining the recent expansion parameter of the battery, the terminal may reduce the expansion rate of the battery according to a specific policy. In some embodiments of this application, the policy may include: The terminal performs the corresponding restrictive measure based on the recent expansion parameter of the battery. Further, a plurality of expansion parameter ranges are obtained through division, and the terminal may determine a range in which the recent expansion parameter of the battery is located, and execute a restrictive measure corresponding to the range.

The plurality of expansion parameter ranges is set according to a gradient. In some embodiments, the plurality of expansion parameter ranges fall within 0 to 1. In some embodiments, compared with the first method, because the recent expansion parameter of the battery is obtained in the second method, a critical value of the expansion parameter range obtained through division is less than a critical value of the expansion parameter range in the first method.

In this application, a larger recent expansion parameter B of the battery indicates a thicker recent expansion thickness of the battery and a poorer recent actual status of the battery. A restrictive measure with a greater strength may be used to reduce the expansion rate of the battery. To be specific, a larger value in the expansion parameter range indicates a stronger corresponding restrictive measure.

Herein, same as the first method, the restrictive measure may also be classified into three types. Reference may be made to related description of the first method, and details are not described herein again.

Table 6 shows several possible recent expansion parameter ranges and corresponding restrictive measures. The restrictive measures shown in Table 6 belong to the type (1), in other words, the expansion rate of the battery is reduced by reducing the charging cutoff voltage.

TABLE 6

Restrictive measures corresponding to expansion parameter ranges

| Expansion parameter range | Restrictive measure |
|---|---|
| 0 ≤ B < 0.049 | None |
| 0.049 ≤ B < 0.07 | Charging cutoff voltage = initial charging cutoff voltage − 50 mV |
| 0.07 ≤ B < 0.105 | Charging cutoff voltage = initial charging cutoff voltage − 100 mV |
| B ≥ 0.105 | Charging cutoff voltage = initial charging cutoff voltage − 200 mV |

Figure 9:
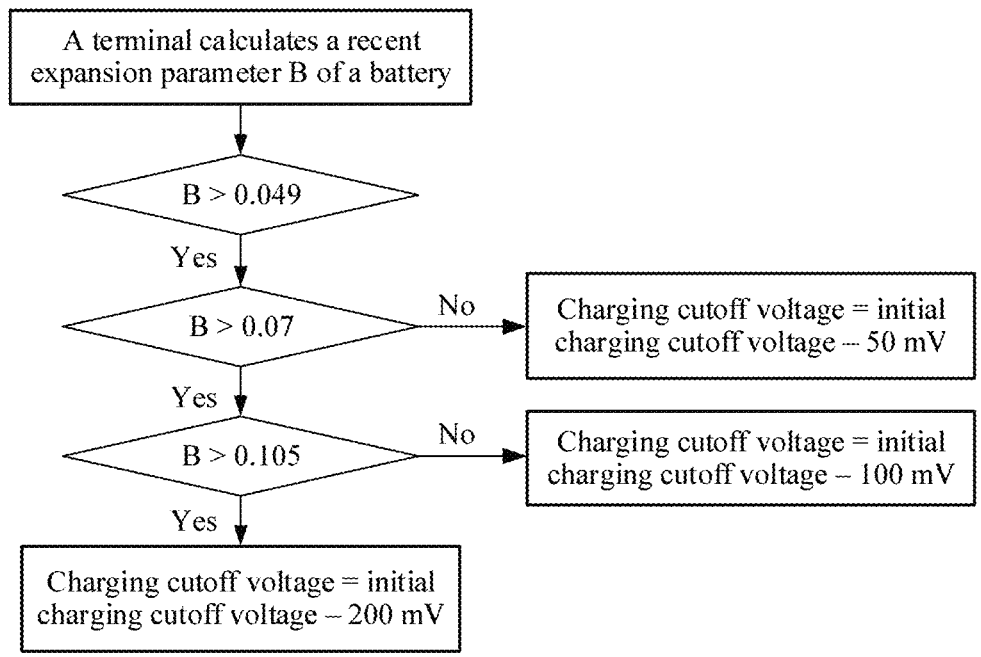
FIG. 9 is a schematic flowchart of executing a restrictive measure based on a recent expansion parameter of a terminal battery according to this application.

FIG. 9 is a schematic flowchart in which the terminal reduces the expansion rate of the battery by using the second method, in other words, based on the recent expansion parameter of the battery. Expansion parameter ranges obtained through division and respectively corresponding restrictive measures in FIG. 9 are shown in Table 6.

It can be learned from Table 4 and FIG. 9 that the recent expansion parameter of the terminal battery has a critical value, and the critical value may be referred to as a third critical value (for example, 0.049 in Table 6). Herein, the third critical value may be the third critical value in the scenario (1) in the embodiment of FIG. 3a to FIG. 3c. To be specific, when the recent expansion parameter of the battery reaches the third critical value, the terminal may notify the user of the current health status of the battery.

When the recent expansion parameter of the battery is less than the third critical value, the terminal does not take a restrictive measure, in other words, does not reduce the charging cutoff voltage or the maximum charging current of the battery, so that use experience of the user can be ensured. The third critical value may be preset. For example, an appropriate third critical value may be obtained by the research and development person through an experiment. It may be understood that third critical values corresponding to batteries of different models may be different, or may be the same. This is not limited herein.

Herein, the restrictive measure corresponding to each expansion parameter range has specific time validity, and is not permanently effective. Specifically, the recent expansion parameter of the terminal battery can reflect only the recent expansion thickness of the battery. With use of the battery and execution of the restrictive measure, a subsequent expansion rate of the terminal may be reduced, or may continue to increase. Therefore, when the terminal obtains the recent expansion parameter through recalculation, a restrictive measure corresponding to the recent expansion parameter may change.

In some embodiments, the restrictive measure corresponding to the expansion parameter range means that when an actual expansion parameter of the terminal falls within the expansion parameter range, a subsequent expansion rate of the terminal battery can be relatively optimally reduced by using the corresponding restrictive measure without affecting the use experience of the user. Herein, the restrictive measure corresponding to each expansion parameter range may be determined by the research and development person through an experiment. It may be understood that for batteries of different models, restrictive measures corresponding to expansion parameter ranges may be the same, or may be different. This is not limited in this application.

In some embodiments, the restrictive measures corresponding to the expansion parameter ranges not only may belong to a same type, but also may belong to different types. To be specific, restrictive measures of different types may be implemented in a cross-combination manner.

In the second method, the terminal records duration of the battery in each recent temperature range and each recent voltage range, to calculate the recent expansion parameter of the battery. Because the recent expansion parameter of the battery reflects the recent expansion thickness of the battery, the corresponding restrictive measure is taken based on the recent expansion parameter of the battery, to be specific, a charging mode is dynamically matched, so that the expansion rate of the battery can be reduced, and the lifespan of the battery can be prolonged.

In the two methods for reducing the expansion rate of the battery, the expansion thickness of the battery is quantized by using a weighted sum of accumulated time of the battery in different temperature ranges and different voltage ranges. The expansion thickness of the battery can be monitored continuously in different use stages of battery, and corresponding restrictive measures can be taken. In the first method, the expansion rate of the battery is reduced based on the overall expansion parameter of the battery, and is more applicable to expansion risk control in the relatively late stage of the life cycle of the battery. In the second method, the expansion rate of the battery is reduced based on the recent expansion parameter of the battery, and is applicable to expansion risk control at any stage of the life cycle of the battery.

The following describes an implementation of a terminal provided in this application.

In this application, the terminal may be a portable electronic device such as a mobile phone, a tablet, a personal digital assistant (personal digital assistant, PDA), or a wearable device. An example embodiment of the portable electronic device includes but is not limited to a portable electronic device using iOS, Android, Microsoft, or another operating system. The portable electronic device may alternatively be another portable electronic device, for example, a laptop computer (laptop) with a touch-sensitive surface (for example, a touch panel). It should be further understood that, in some other embodiments of this application, the terminal may alternatively be a desktop computer with a touch-sensitive surface (for example, a touch panel), but not the portable electronic device.

In this application, the terminal is configured with a display screen, and the display screen may be configured to display interface content currently output by a system of the terminal and various types of prompt information. The interface content may include an interface of a running application, a system-level menu, and the like, and may specifically include the following interface elements: input interface elements such as a button (button), a text (text) input box, a scroll bar (scroll Bar), and a menu (menu), and output interface elements such as a window (window) and a label (label). For the prompt information, reference may be made to related descriptions in the embodiments of FIG. 4A to FIG. 9.

Figure 10:
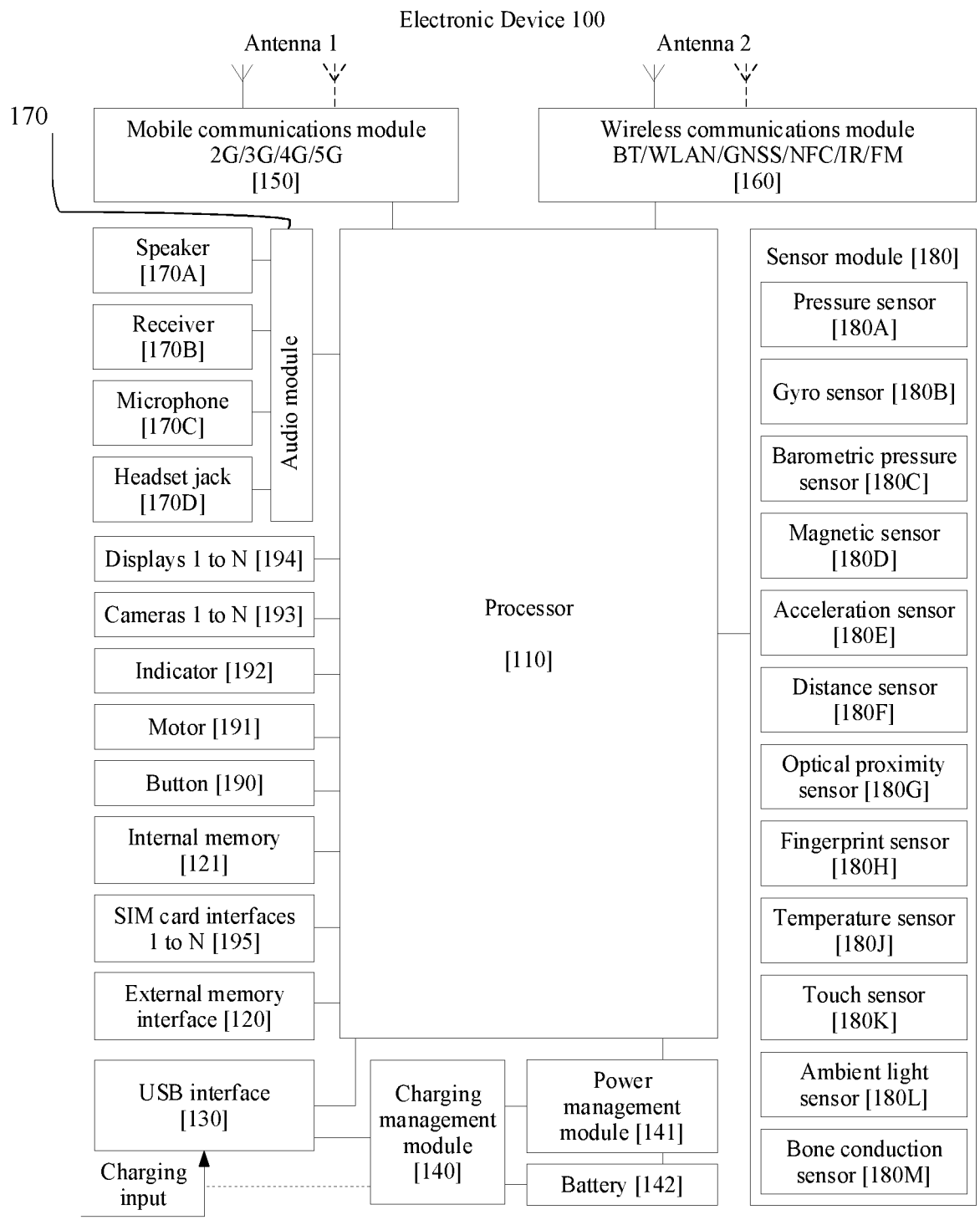
FIG. 10 is a schematic structural diagram of a terminal according to this application.

FIG. 10 shows a possible structure of a terminal according to this application.

As shown in the figure, the terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the illustrated structure in the embodiments of the present invention does not constitute a specific limitation on the terminal 100. In some other embodiments of this application, the terminal 100 may include more or fewer components than those shown in the figure, or combine some components, or divide some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent devices, or may be integrated into one or more processors.

The controller may be a nerve center and a command center of the terminal 100. The controller may generate an operation control signal based on instruction operation code and a time sequence signal, to complete control of instruction reading and instruction execution.

The memory may be further disposed in the processor 110, and is configured to store an instruction and data. In some embodiments, the memory in the processor 110 is a cache. The memory may store an instruction or data that has been used or cyclically used by the processor 110. If the processor 110 needs to use the instruction or the data again, the processor 110 may directly invoke the instruction or the data from the memory, to avoid repeated access and reduce a waiting time of the processor 110, thereby improving efficiency of a system.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display screen 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, and the like. The GPIO interface may further be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the terminal 100, or may be configured to transmit data between the terminal 100 and a peripheral device, or may be configured to connect to a headset to play audio by using the headset. The interface may be further configured to connect to another terminal such as an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the embodiment, or a combination of a plurality of interface connection manners.

The battery 142 is a chemical power source, and includes a positive electrode and a negative electrode respectively formed by two electrochemically active electrodes of different components. The two electrodes are immersed in an electrolyte, and provide electric energy by converting chemical energy inside the electrodes. In this application, the battery 142 may be a lithium-ion battery, a nickel metal hydride battery, a lithium polymer battery, a lead-acid battery, or the like. In some embodiments of this application, the battery 142 is a lithium-ion battery, and works by moving the lithium ion between the positive electrode and the negative electrode. After the battery 142 is put into use, the battery gradually expands (to be specific, a thickness of the battery increases), and an expansion process is almost irreversible.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal 100. The charging management module 140 may further supply power to the terminal by using the power management module 141 while charging the battery 142. In some embodiments of this application, the charging management module 140 may be configured to perform a restrictive measure corresponding to a range in which an overall/recent expansion parameter of the battery 142 is located. Herein, the restrictive measure may be classified into the following three types: (1) reducing a charging cutoff voltage of the battery; (2) reducing a maximum charging current of the battery; and (3) reducing the charging cutoff voltage and the maximum charging current of the battery. Herein, for an expansion parameter range of the battery 142 and a specific restrictive measure, refer to related descriptions of the first method and the second method.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device. In some embodiments of this application, the power management module 141 may be configured to monitor a voltage of the battery 142.

A wireless communication function of the terminal 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the terminal 100, to wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the terminal 100 are coupled, and the antenna 2 and the wireless communications module 160 of the terminal 100 are coupled, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or satellite-based augmentation system (satellite based augmentation systems, SBAS).

The terminal 100 implements the display function by using the GPU, the display screen 194, the application processor, and the like. The GPU is a microprocessor for image processing, and connects the display screen 194 to the application processor. The GPU is configured to: perform mathematical and geometric calculation, and render an image. The processor 110 may include one or more GPUs, and execute a program instruction to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a Miniled, a MicroLed, a Micro-oLed, a quantum dot light-emitting diode (quantum dot light emitting diodes, QLED), or the like. In some embodiments, the terminal 100 may include one or N display screens 194, where N is a positive integer greater than 1.

The terminal 100 can implement the photographing function by using the ISP, the camera 193, the video codec, the GPU, the display screen 194, the application processor, and the like.

The ISP is configured to process data fed back by the camera 193. For example, during photographing, a shutter is opened, a ray of light is transmitted to a light-sensitive element of the camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge-coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal. In addition to the digital image signal, the digital signal processor may further process another digital signal. For example, when the terminal 100 selects a frequency, the digital signal processor is configured to perform Fourier transform on frequency energy and the like.

The video codec is configured to compress or decompress a digital video. The terminal 100 may support one or more video codecs. In this way, the terminal 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to connect to an external memory card, for example, a Micro SD card, to extend a storage capability of the terminal 100. The external memory card communicates with the processor 110 through the external memory interface 120, to implement a data storage function. For example, a file such as music or a video is stored in the external memory card.

The internal memory 121 may be configured to store computer-executable program code, and the executable program code includes an instruction. The processor 110 runs the instruction stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data or a phone book) created in a use process of the terminal 100, and the like. In addition, the internal memory 121 may include a high-speed random access memory, and may further include a nonvolatile memory, for example, at least one magnetic disk storage device, a flash storage device, or a universal flash storage (universal flash storage, UFS).

In some embodiments of this application, the processor 110 may be further configured to: cumulatively record voltages that are of the battery 142 and that are monitored by the power management module 141 and temperatures that are of the battery 142 and that are monitored by the temperature sensor 180J; and store the voltages and the temperatures in the internal memory 121. Optionally, the processor 110 may store, in a form of a table, duration of the 142 in each temperature range and each voltage range. It may be understood that, in some embodiments of this application, a special-purpose processor may be further configured for the terminal 100, and is configured to record the voltage that is of the battery 142 and that is monitored by the power management module 141 and the temperature that is of the battery 142 and that is monitored by the temperature sensor 180J.

In this application, the internal memory 121 may be further configured to store one or more of the following:

usage of the battery from time when the battery is put into use to current time or recent usage of the battery (namely, the duration of the battery in each temperature range and each voltage range), an expansion coefficient of the battery 142, and a restrictive measure corresponding to each expansion parameter range. Herein, for the overall/recent usage and the expansion coefficient of the battery 142, and the restrictive measure corresponding to each expansion parameter range, refer to related descriptions in Table 2 to Table 6, FIG. 7, and FIG. 9, and details are not described herein again.

In some embodiments of this application, the processor 110 may further calculate the overall/recent expansion parameter of the battery 142 based on the usage that is of the battery 142 and that is stored in the memory 121 from the time when the battery 142 is put into use to the current time or the recent usage that is of the battery 142 and that is stored in the memory 121, and the expansion coefficient of the battery 142. Herein, for a specific manner in which the processor calculates the overall/recent expansion parameter of the battery 142, refer to related descriptions of the first method and the second method.

In some embodiments of this application, after calculating the overall/recent expansion parameter of the battery 142, the processor 110 may further indicate the charging management module 140 to execute the restrictive measure corresponding to the range in which the overall/recent expansion parameter of the battery 142 is located.

The terminal 100 can implement an audio function by using the audio module 170, the speaker 170A, the receiver 170B, the microphone 170C, the headset jack 170D, the application processor, and the like, for example, music playing or recording.

The audio module 170 is configured to convert digital audio information to an analog audio signal for output, and is also configured to convert an analog audio input to a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal to a sound signal. The terminal 100 may be used to listen to music or answer a call in a hands-free mode over the speaker 170A.

The receiver 170B, also referred to as an "earpiece", is configured to convert an audio electrical signal to a sound signal. When a call is answered or audio information is listened to by using the terminal 100, the receiver 170B may be put close to a human ear to listen to a voice.

The microphone 170C, also referred to as a "mic" or a "sound conducting device", is configured to convert a sound signal into an electrical signal. When making a call or sending voice information, a user may make a sound by moving the human mouth close to the microphone 170C to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB interface 130, a 3.5 mm open mobile terminal platform (open mobile terminal platform, OMTP) standard interface, or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, a capacitance between electrodes changes. The terminal 100 determines pressure intensity based on a change in the capacitance. When a touch operation is performed on the display screen 194, the terminal 100 detects intensity of the touch operation by using the pressure sensor 180A. The terminal 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messages application icon, an instruction for viewing an SMS message is performed. When a touch operation whose touch operation intensity is greater than or equal to the first pressure threshold is performed on the messages application icon, an instruction for creating a new SMS message is performed.

The gyro sensor 180B may be configured to determine a moving posture of the terminal 100. In some embodiments, an angular velocity of the terminal 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may further be used in a navigation scenario and a somatic game scenario.

The barometric pressure sensor 180C is configured to measure barometric pressure. In some embodiments, the terminal 100 calculates an altitude by using the barometric pressure measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the terminal 100, and may detect magnitude and a direction of the gravity when the terminal 100 is still. The acceleration sensor 180E may be further configured to identify a posture of the terminal, and is applied to an application such as switching between a landscape mode and a portrait mode or a pedometer.

The distance sensor 180F is configured to measure a distance. The terminal 100 may measure the distance in an infrared or a laser manner. In some embodiments, in a photographing scenario, the terminal 100 may measure the distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the user holds the terminal 100 close to an ear to make a call, to automatically perform screen-off for power saving. The optical proximity sensor 180G may alternatively be used in a cover mode or a pocket mode to automatically unlock or lock the screen.

The ambient light sensor 180L is configured to sense ambient light brightness. The terminal 100 may adaptively adjust brightness of the display screen 194 based on the sensed ambient light brightness. The ambient light sensor 180L may further be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor nearby the temperature sensor 180J, to reduce power consumption for thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature. In some embodiments of this application, the temperature sensor 180J may be disposed around the battery 142, to monitor the temperature of the battery 142.

The touch sensor 180K is also referred to as a "touch panel". The touch sensor 180K may be disposed on the display screen 194. The touch sensor 180K and the display screen 194 form a touchscreen that is also referred to as a "touchscreen". The touch sensor 180K is configured to detect a touch operation on or near the touch sensor 180K. The touch sensor may transfer the detected touch operation to the application processor to determine a type of a touch event. A visual output related to the touch operation may be provided by using the display screen 194. In some other embodiments, the touch sensor 180K may further be disposed on a surface of the terminal 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may further contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may further be compatible with an external memory card. The terminal 100 interacts with a network by using the SIM card, to implement functions such as conversation and data communication. In some embodiments, the terminal 100 uses an eSIM, namely, an embedded SIM card. The eSIM card may be embedded into the terminal 100, and cannot be separated from the terminal 100.

A software system of the terminal 100 may use a layered architecture, an event-driven architecture, a microkernel architecture, a micro service architecture, or a cloud architecture. In this embodiment of the present invention, an Android system with the layered architecture is used as an example to describe a software structure of the terminal 100.

Figure 11:
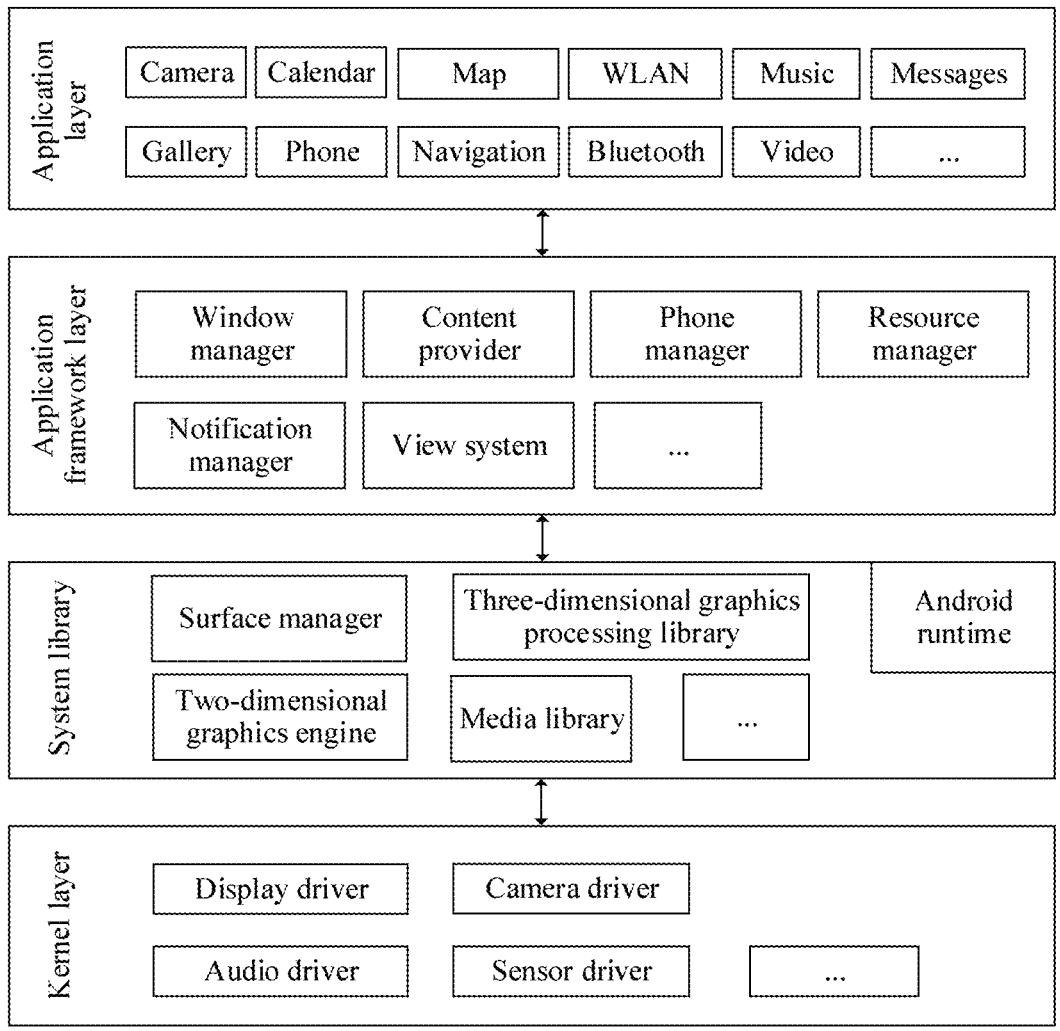
FIG. 11 is a block diagram of a software structure of a terminal according to this application.

FIG. 11 is a block diagram of a software structure of a terminal 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 11, the application package may include applications such as "camera", "gallery", "calendar", "phone", "map", "navigation", "WLAN", "Bluetooth", "music", "video", and "messages".

The application framework layer provides an application programming interface (application programming interface, API) and a programming framework for an application at the application layer. The application framework layer includes some predefined functions.

As shown in FIG. 11, the application framework layer may include a window manager, a content provider, a view system, a phone manager, a resource manager, a notification manager, and the like.

The window manager is configured to manage a window program. The window manager may obtain a size of the display screen, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be configured to construct an application. A display interface may include one or more views. For example, a display interface including a messages notification icon may include a text display view and an image display view.

The phone manager is configured to provide a communication function for the terminal 100, for example, management of a call status (including answering or declining).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring user interaction. For example, the notification manager is configured to notify download completion, give a message notification, and the like. The notification manager may be a notification that appears in a top status bar of the system in a form of a graph or a scroll bar text, for example, a notification of an application running on the background, or may be a notification that appears on the screen in a form of a dialog window. For example, text information is displayed in the status bar, a prompt tone is played, the terminal vibrates, or the indicator light blinks.

The Android runtime includes a core library and a virtual machine. The Android runtime is responsible for scheduling and management of the Android system.

The core library includes two parts: a function that needs to be invoked in a java language, and a core library of Android.

The application layer and the application framework layer run on the virtual machine. The virtual machine executes java files of the application layer and the application framework layer as binary files. The virtual machine is configured to implement functions such as object life cycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. A camera application invokes an interface at the application framework layer to enable the camera application, then enables the camera driver by invoking the kernel layer, and captures a static image or a video through the camera 193.

Figure 12A:
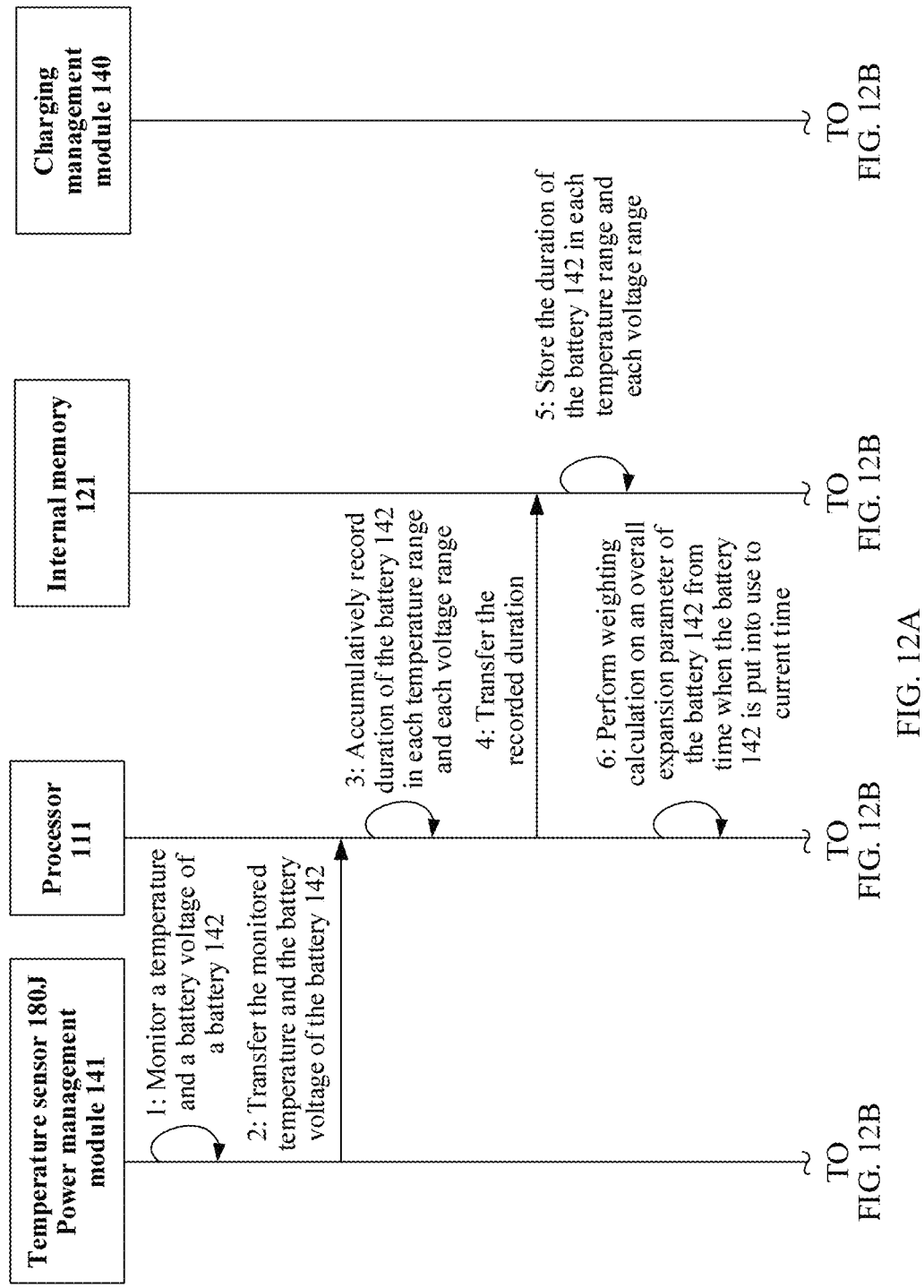
FIG. 12A and FIG. 12B are a schematic flowchart of interaction between hardware drivers inside a terminal.
Figure 12B:
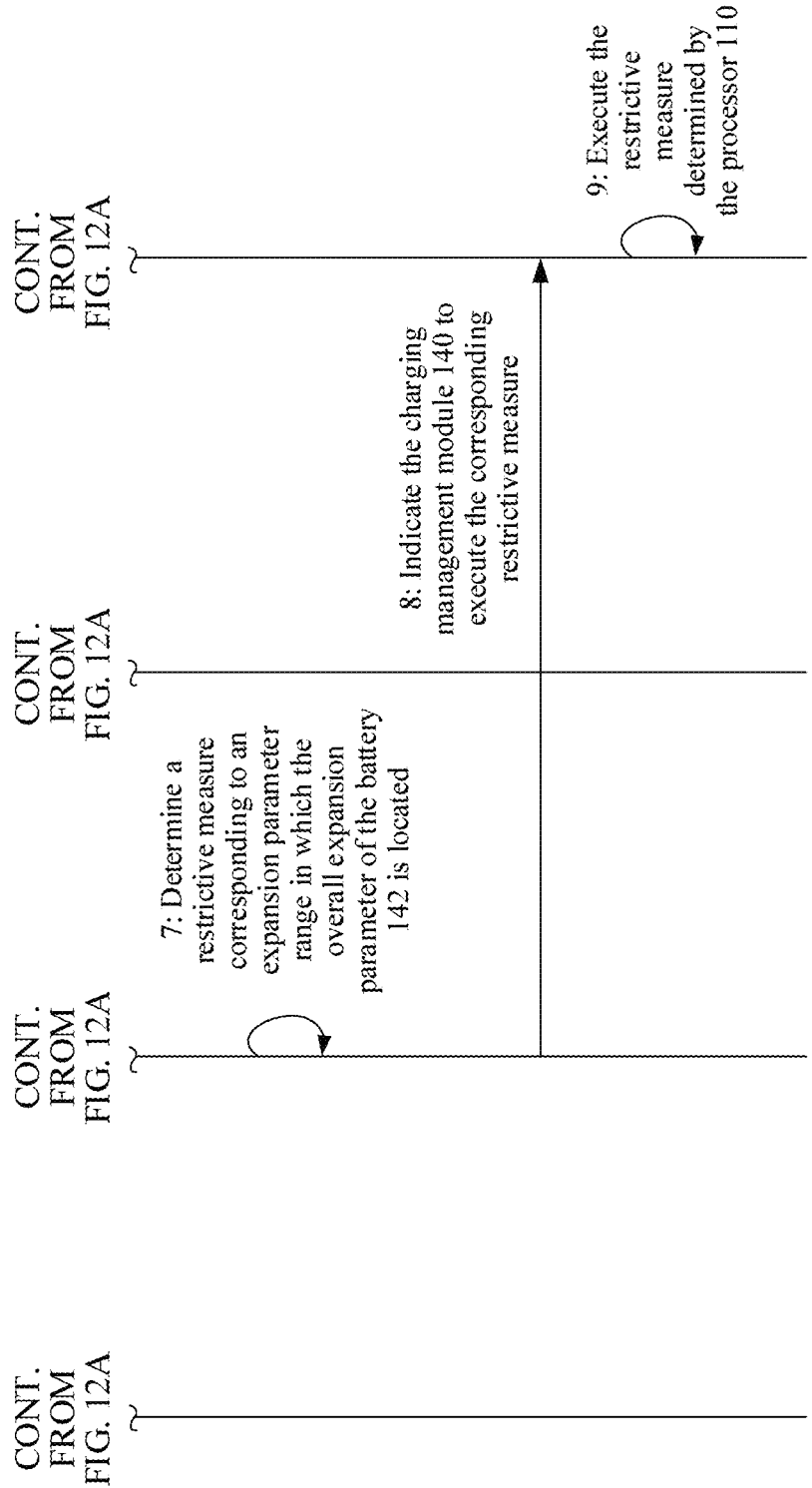

The following describes in detail a cooperation relationship between the components in the terminal 100 in this application when the expansion rate of the battery is reduced by using the first method as an example, and reference is made to FIG. 12A and FIG. 12B.

1: When the battery 142 is put into use, the temperature sensor 180J monitors the temperature of the battery 142, and the power management module 141 monitors the battery voltage of the battery 142.

2: The temperature sensor 180J transfers the monitored temperature of the battery 142 to the processor 110, and the power management module 141 transfers the monitored battery voltage of the battery 142 to the processor 110.

3: The processor 110 cumulatively records the duration of the battery 142 is in each temperature range and each voltage range.

4: The processor 110 transfers the recorded duration to the internal memory 121.

5: The internal memory 121 stores the duration of the battery 142 is in each temperature range and each voltage range. In addition, the internal memory 121 further stores the expansion coefficient of the battery 142 and the restrictive measure corresponding to each expansion parameter range.

Optionally, the internal memory 121 may store, in the form of the table, the duration of the 142 in each temperature range and each voltage range. For details, refer to related descriptions in Table 2 and Table 5.

Optionally, for the expansion coefficient of the battery 142, refer to Table 3 and related description. For the restrictive measure corresponding to each expansion parameter range, refer to Table 3 and related description.

6: The processor 110 performs weighting calculation on the overall expansion parameter of the battery 142 from the time when the battery 142 is put into use to the current time.

Specifically, the processor 110 may calculate the overall expansion parameter of the battery 142 by using the formula 1, and reference may be made to the related description of the formula 1.

7: The processor 110 determines an expansion parameter range in which the overall expansion parameter of the battery 142 is located, and determines a restrictive measure corresponding to the expansion parameter range.

8: The processor 110 indicates the charging management module 140 to execute the determined restrictive measure.

9: The charging management module 140 executes the restrictive measure determined by the processor 110.

Specifically, for the restrictive measure executed by the charging management module 140, refer to related description in the first method. Details are not described herein again.

It may be understood that a cooperation relationship between the components in the terminal 100 in this application when the expansion rate of the battery is reduced by using the second method is similar to that in FIG. 12A and FIG. 12B. Details are not described herein again.

Figure 13:
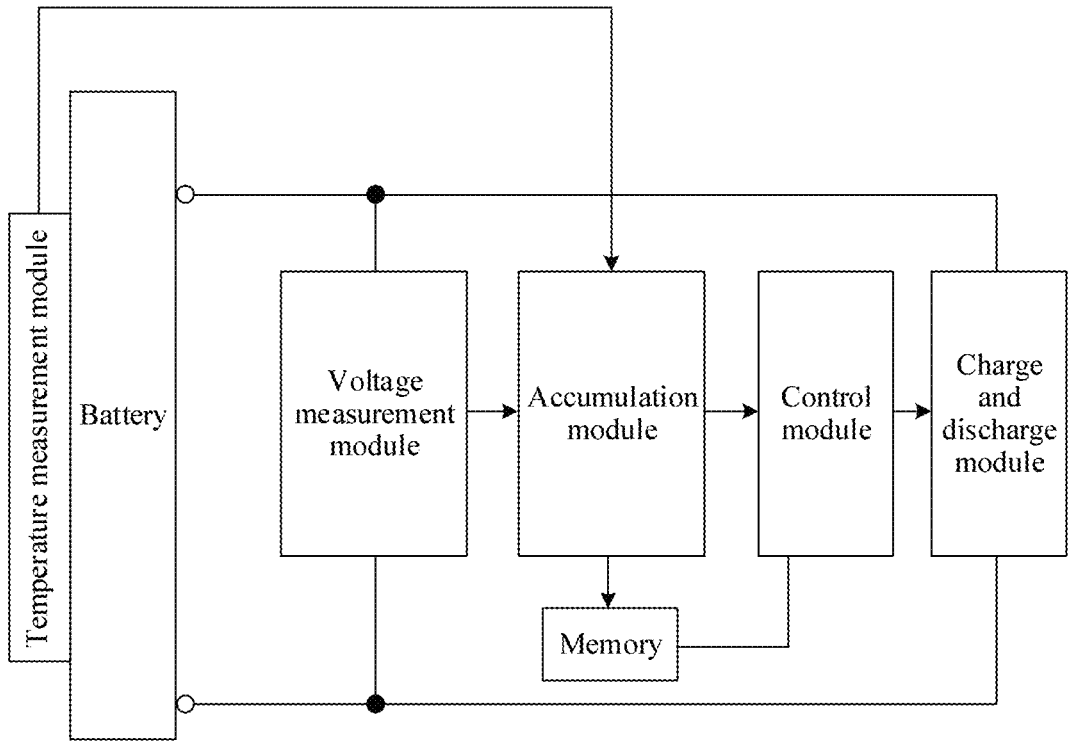
FIG. 13 is a schematic structural diagram of a charging management apparatus according to this application.

FIG. 13 is a schematic structural diagram of a charging management apparatus according to this application. The apparatus is applied to a terminal, and can reduce an expansion rate of a battery and prolong a lifespan of the battery.

As shown in FIG. 13, the apparatus includes the battery, a temperature measurement module, a voltage measurement module, an accumulation module, a memory, a control module, and a charge and discharge module.

The battery is configured to convert internal chemical energy of the battery to provide electric energy for the terminal.

The temperature measurement module is configured to measure a temperature of the battery.

The voltage measurement module is configured to measure a voltage of the battery.

The accumulation module is configured to accumulatively record usage of the battery. In some embodiments, the usage of the battery includes duration at each temperature and/or each voltage from time when the battery is put into use to current time or recent duration at each temperature and/or each voltage. In an optional embodiment, the accumulation module may accumulatively record the usage of the battery in a table manner. For example, the table recorded by the accumulation module may be shown in Table 2 or Table 5. The accumulation module may be a software module, or may be a hardware module.

The memory is configured to store the usage that is of the battery and that is accumulatively recorded by the accumulation module of the battery. In some embodiments, the memory may be further configured to store an expansion coefficient of the battery and a restrictive measure corresponding to each expansion parameter range. Herein, for the expansion coefficient of the battery and the restrictive measure corresponding to each expansion parameter range, refer to related descriptions in Table 3, FIG. 7, and FIG. 9. Details are not described herein again.

The control module is configured to obtain the expansion parameter of the battery based on the usage that is of the battery and that is stored in the memory. Herein, for a manner of obtaining the expansion parameter, refer to related descriptions of the formula 1 or the formula 2.

The charge and discharge module is configured to execute a restrictive measure corresponding to an expansion parameter range in which the battery expansion parameter of the battery is located. Herein, for the expansion parameter range of the battery and the specific restrictive measure, refer to related descriptions in Table 4 or Table 6.

In some embodiments, the battery, the temperature measurement module, the voltage measurement module, the memory, the control module, and the charge and discharge module in FIG. 13 are hardware modules.

Based on the human-computer interaction embodiments and the terminal 100 described in the embodiment in FIG. 10, the following describes the charging management method provided in this application.

FIG. 13 is a schematic flowchart of a charging management method according to this application. The charging management method is applied to the terminal, and the terminal is configured with the battery. Details are described below.

S301: Charge the terminal battery.

Specifically, that the terminal battery is charged means that the terminal battery is connected to the power supply, and the conductive particles inside the battery are transferred from the positive electrode of the battery and embedded into the negative electrode. A process of charging the terminal battery is a process of storing electric energy by the terminal battery.

S302: If the working parameter of the terminal battery does not meet a first condition, stop charging the terminal battery when a battery voltage reaches V1; and if the working parameter of the terminal battery meets the first condition, stop charging the terminal battery when the battery voltage reaches V2, where V1>V2. The working parameter of the terminal battery includes working duration of the terminal battery at a plurality of temperatures, and/or the working duration of the terminal battery at the plurality of battery voltages.

Specifically, the terminal may obtain the working parameter of the battery. Optionally, the terminal may obtain the working parameter of the terminal battery from the time when the terminal battery is put into use. The working parameter of the terminal battery may reflect the health status of the terminal battery. Herein, the health status of the terminal battery may include the battery temperature, the battery voltage, the overall expansion thickness of the battery, the recent expansion thickness or aging of the battery, or the like.

In some embodiments, the working parameter of the battery may be a working parameter of the terminal battery from the time when the battery is put into use to the current time or may be a working parameter of the terminal battery in a recent period of time. That the battery is put into use may include: the battery is delivered from the factory, or the battery is charged for the first time, or the battery is discharged for the first time. The recent period of time may be preset when the terminal is delivered from the factory, or may be independently set by the user or the terminal. For example, the recent period of time may be one week, one month, one year, or the like. This is not limited herein.

In some embodiments, the working parameter of the battery may include the working duration of the terminal battery at the plurality of temperatures and/or the working duration of the terminal battery at the plurality of battery voltages. Herein, the working duration may be time after the battery is delivered from the factory, or may be time after the battery is configured on the terminal, or may be time for charging and/or discharging the battery. This is not limited in this application. For example, referring to Table 2 or Table 5, the working parameter of the battery may be recorded in a table manner.

In some embodiments, the first condition may include that the expansion parameter of the terminal battery is greater than a threshold. Herein, the expansion parameter may reflect the expansion thickness of the battery.

Specifically, the terminal may obtain the expansion parameter of the terminal battery based on the working parameter of the terminal battery. The following provides two possible manners in which the terminal obtains the expansion parameter of the terminal battery based on the working parameter of the terminal battery.

In a first manner, the terminal obtains the overall expansion parameter of the terminal battery based on the working parameter of the terminal battery from the time when the terminal battery is put into use to the current time. The overall expansion parameter may reflect an overall expansion thickness of the terminal battery from the time when the terminal battery is put into use to the current time.

Optionally, the terminal may obtain the overall expansion parameter of the terminal battery in the weighting calculation manner.

For example, the terminal may obtain the overall expansion parameter of the terminal battery by using the formula 1:

$$A=\Sigma_{j=1}^{m}\Sigma_{i=1}^{n}(t(T_i,V_j) \times a(T_i,V_j)) \qquad \text{formula 1}$$

In the formula 1, A is the overall expansion parameter of the terminal battery from the time when the terminal battery is put into use to the current time, $T_i$ is an $i^{th}$ temperature range, $V_j$ is a $j^{th}$ voltage range, $t(T_i, V_j)$ is duration from the time when the terminal is put into use to the current time when a battery temperature is $T_i$ and a battery voltage is $V_j$, $a(T_i, V_j)$ is an expansion coefficient when the terminal battery temperature is $T_i$ and the terminal battery voltage is $V_j$, $1 \le i \le n$, $1 \le j \le m$, i and j are positive integers, n is a total quantity of divided temperature ranges, and m is a total quantity of divided voltage ranges.

The expansion coefficient of the terminal battery may be stored in the terminal, or may be obtained by the terminal by using the network. For example, for the expansion coefficient of the terminal battery, refer to the Table 3 and related description. The expansion coefficient of the battery is an attribute of the battery, and does not change with the external factor. Batteries of different models may have different expansion coefficients. In a possible implementation, the expansion coefficient of the battery may be obtained by the research and development person by using the experimental test. It may be understood that the research and development person may separately obtain expansion coefficients of batteries of different models.

In the first manner, a threshold corresponding to the overall expansion parameter of the terminal battery is not limited to a default setting when the terminal is delivered from the factory, and may be further independently set by the user. In a specific implementation, the threshold corresponding to the overall expansion parameter of the terminal battery is the first critical value in the embodiments of FIG. 3a to FIG. 3c, FIG. 5, and FIG. 7 and related description in Table 4, and reference may be made to related descriptions.

To be specific, the first condition may be that the overall expansion parameter of the terminal battery is greater than the first critical value.

In a second manner, the terminal obtains the recent expansion parameter of the terminal battery based on a recent working parameter of the terminal battery. The recent expansion parameter may reflect the recent expansion thickness of the terminal battery.

Optionally, the terminal may obtain the recent expansion parameter of the terminal battery in the weighting calculation manner.

For example, the terminal may obtain the recent expansion parameter of the terminal battery by using the formula 2:

$$B=\Sigma_{j=1}^{m}\Sigma_{i=1}^{n}(t'(T_i,V_j) \times a'(T_i,V_j)) \qquad \text{formula 2}$$

In the formula 2, B is the recent expansion parameter of the terminal battery, $T_i$ is an $i^{th}$ temperature range, $V_j$ is a $j^{th}$ voltage range, $t'(T_i, V_j)$ is duration when a recent terminal temperature is $T_i$ and a terminal recent voltage is $V_j$, $a'(T_i, V_j)$ is an expansion coefficient when the terminal battery temperature is $T_i$ and the terminal battery voltage is $V_j$, $1 \le i \le n$, $1 \le j \le m$, i and j are positive integers, n is a total quantity of divided temperature ranges, and m is a total quantity of divided voltage ranges.

The expansion coefficient of the terminal battery is the same as that in the first manner, and reference may be made to related description.

In the second manner, a threshold corresponding to the recent expansion parameter of the terminal battery is not limited to a default setting when the terminal is delivered from the factory, and may be further independently set by the user. In a specific implementation, the threshold corresponding to the recent expansion parameter of the terminal battery is the third critical value in the embodiments of FIG. 3a to FIG. 3c, FIG. 5, and FIG. 7 and related description in Table 4, and reference may be made to related descriptions.

To be specific, the first condition may be that the recent expansion parameter of the terminal battery is greater than the third critical value.

Not limited to the first condition in the embodiments, in some embodiments, the first condition may further include: working duration of the battery at a high voltage and a high temperature exceeds the first value, continuous charging/discharging duration of the battery exceeds a third value, and the like. The high voltage and the high temperature may be default settings when the terminal is delivered from the factory, or may be independently set by the terminal or the user. For example, when a difference between an actual battery voltage and the maximum design voltage is less than 200 mV, it may be considered that the battery is in the high-voltage state.

Specifically, if the working parameter of the terminal battery does not meet the first condition, charging of the terminal battery is stopped when the battery voltage reaches V1. If the working parameter of the terminal battery meets the first condition, charging the terminal battery is stopped when the battery voltage reaches V2, where V1>V2.

Herein, that charging of the terminal battery is stopped when the battery voltage reaches V1 or V2 means that when the battery voltage is V1 or V2, the conductive particles inside the battery are no longer transferred from the positive electrode of the battery and are embedded into the negative electrode, and the terminal battery does not further store electric energy. In a possible implementation, if the working parameter of the terminal battery meets the first condition, the terminal may reduce a charging cutoff voltage from V1 to V2, to stop charging the terminal battery when the battery voltage reaches V2.

When the working parameter of the terminal battery meets the first condition, charging of the terminal battery is stopped when the battery voltage reaches V2. Compared with a case in which charging of the terminal battery is stopped when the battery voltage reaches V1, this case reduces a battery voltage that can be actually reached when the terminal battery is charged. In other words, charging of the terminal battery is stopped when the battery voltage reaches V2, so that the duration of the battery in the high-voltage state can be relatively reduced. This reduces the expansion rate of the battery, and slows down expansion of the battery.

In an optional implementation, V1 may be an initial charging cutoff voltage or a maximum design voltage.

In an optional implementation, when the first condition is that the expansion parameter of the battery reaches the threshold, the terminal stops charging the terminal battery when the battery voltage reaches V2. The expansion parameter of the battery may reflect the expansion thickness of the battery. Therefore, when the battery expands to a specific thickness, the expansion rate of the battery can be reduced and expansion of the battery can be slowed down.

In an optional embodiment, a difference between V2 and V1 is related to the working parameter of the terminal battery.

The working parameter of the terminal battery may reflect the health status of the terminal battery. When the health status of the terminal battery deteriorates, the difference between V2 and V1 may be increased. In a possible manner, when the health status of the terminal battery deteriorates, the value of V2 may be reduced. If the working parameter of the terminal battery meets the first condition, charging of the terminal battery is stopped when the battery voltage reaches V2. In this case, a smaller value of V2 indicates shorter working duration of the battery in the high-voltage state and a slower expansion rate of the battery.

In a possible implementation, the terminal may obtain an expansion parameter of the terminal battery based on the working parameter of the terminal battery, and determine the value of V2 based on the expansion parameter of the terminal battery. A larger expansion parameter of the terminal battery indicates a thicker expansion thickness of the terminal battery and a smaller value of V2. Optionally, the terminal may divide a plurality of expansion parameter ranges, and determine V2 based on an expansion range in which the expansion parameter of the terminal battery is located. For example, referring to Table 4 and FIG. 7, when the terminal obtains the overall expansion parameter of the terminal battery, V2 may be the charging cutoff voltage in the restrictive measure shown in Table 4 and FIG. 7. For example, referring to Table 6 and FIG. 9, when the terminal obtains the recent expansion parameter of the terminal battery, V2 may be the charging cutoff voltage in the restrictive measure shown in Table 6 and FIG. 9.

Figure 14:
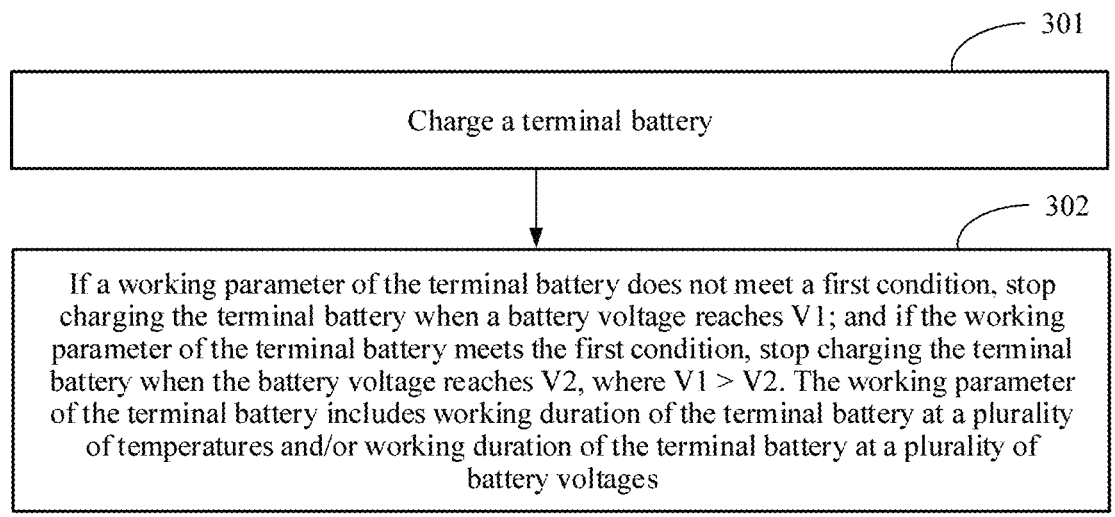
FIG. 14 is a schematic flowchart of a charging management method according to this application.

According to the charging management method shown in FIG. 14, if the working parameter of the terminal battery meets the first condition, charging of the terminal battery is stopped when the battery voltage reaches V2, so that the duration of the battery in the high-voltage state can be relatively reduced. This reduces the expansion rate of the battery and slows down expansion of the battery.

Figure 15:
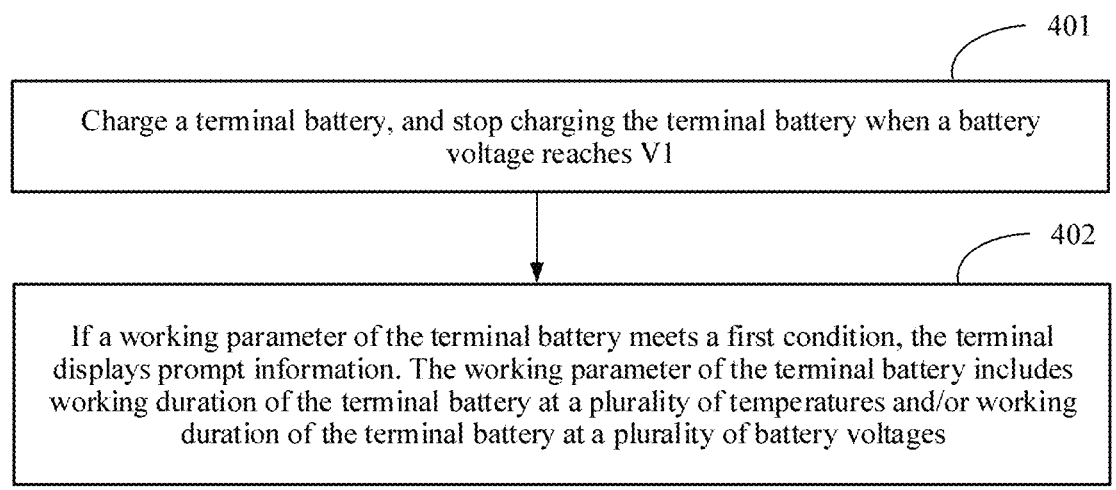
FIG. 15 is a schematic flowchart of another charging management method according to this application.

FIG. 15 is a schematic flowchart of another charging management method according to this application. The charging management method is applied to the terminal, and the terminal is configured with the battery. Details are described below.

S401: Charge the terminal battery, and stop charging the terminal battery when a battery voltage reaches V1.

Specifically, charging the terminal battery and stopping charging are the same as those in the embodiment of FIG. 14, and reference may be made to related descriptions. In an optional implementation, V1 may be an initial charging cutoff voltage or a maximum design voltage.

S402: If the working parameter of the terminal battery meets a first condition, the terminal displays prompt information. The working parameter of the terminal battery includes working duration of the terminal battery at a plurality of temperatures and/or the working duration of the terminal battery at a plurality of battery voltages.

Specifically, the working parameter of the terminal battery and the first condition are the same as those in step S302 in the embodiment of FIG. 14, and reference may be made to related descriptions.

Specifically, when the working parameter of the terminal battery meets the first condition, the prompt information displayed by the terminal may be used to notify the user of the health status of the battery. Herein, the health status of the terminal battery may include the battery temperature, the battery voltage, the overall expansion thickness of the battery, the recent expansion thickness or aging of the battery, or the like.

For example, referring to FIG. 3a to FIG. 3c, the prompt information may be displayed at the top of the touchscreen of the terminal in the form of the pop-up window, or may be displayed in the notification bar of the terminal, or may be displayed in the form of the score.

After the terminal displays the prompt information, the user may execute some measures to protect the battery. Optionally, the measures executed by the user may include: reducing floating charge time of the battery, avoiding charging the terminal battery while using the terminal, avoiding excessively high power consumption of the terminal, and the like.

In some embodiments, after step S402, the method may further include: The terminal receives a first user operation input by the user. The terminal enables the battery protection mode in response to the first user operation. When the terminal battery is charged in the battery protection mode, charging of the terminal battery is stopped when the battery voltage reaches V2, where V1>V2.

Herein, a value of V2 is the same as that in the embodiment of FIG. 14, and reference may be made to related description.

In a possible implementation, the first user operation includes a tap operation performed on an enable option of the battery protection mode, and the enable option of the battery protection mode may be displayed on a battery setting interface. For example, referring to the battery setting interface in the accompanying drawing on the right side of FIG. 2A and FIG. 2B, the enable option of the battery protection mode may be 202 in the figure. Herein, the battery setting interface may be displayed by the terminal in response to the tap operation performed by the user on the battery option 401 in the accompanying drawing on the left side of FIG. 2A and FIG. 2B, or may be displayed by the terminal in response to the tap operation performed by the user on the pop-up window 301 at the top of the screen in FIG. 3a, or may be displayed by the terminal in response to the tap operation performed by the user on the prompt information 302 in the notification bar in FIG. 3c. This is not limited in this application.

In some embodiments, after step S402, the method may further include: if the working parameter of the terminal battery meets a second condition, the terminal notifies the user of replacing the terminal battery.

In a possible implementation, the second condition may include that the expansion parameter of the terminal battery is greater than the second critical value. The expansion parameter herein is the overall expansion parameter of the terminal battery. For a definition and an obtaining manner of the expansion parameter, refer to related descriptions of the first manner in the embodiment of FIG. 14. Herein, the second critical value may be the second critical value in the embodiments of FIG. 6A and FIG. 9 and related description in Table 6, and reference may be made to related descriptions.

For example, referring to the accompanying drawing on the left side of FIG. 6A and FIG. 6B, the terminal may notify, in the floating window form, the user of replacing the battery. Not limited to the accompanying drawing on the left side of FIG. 6A and FIG. 6B, the terminal may further notify the user of replacing the battery in the manner of the prompt tone, vibration, indicator blinking, displaying prompt information in the pop-up window at the top of the screen or in the notification bar, or the like. This is not limited in this application. In the manner, if the working parameter of the terminal battery meets the second condition, the terminal notifies the user of replacing the battery, so that the user can be prevented from continuously using a battery that is in the relatively late stage of the life cycle. This prevents the battery from spill or explosion.

According to the charging management method shown in FIG. 15, if the working parameter of the terminal battery meets the first condition, the terminal displays the prompt information, to notify the user of the current health status of the battery. After the user is notified by using the prompt information, the user may take a specific measure to protect the battery, to ensure battery health.

Various implementations of this application may be randomly combined to achieve different technical effects.

All or some of the embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In short, the descriptions are only embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A charging management method comprising:
    charging a battery;
    stopping charging the battery when a first battery voltage of the battery reaches a first predetermined voltage (V1); and thereafter
    obtaining a working parameter of the battery from a first time when the battery is put into use to a current time; and
    displaying prompt information when the working parameter meets a first condition, wherein the working parameter comprises at least one of, first working durations of the battery at a plurality of temperatures, or second working durations of the battery at a plurality of second battery voltages.

2. The charging management method of claim 1, further comprising further displaying, in a form of a pop-up window, the prompt information at a top of a touchscreen.

3. The charging management method of claim 1, wherein after displaying the prompt information, the charging management method further comprises:
    receiving a first user operation;
    enabling, in response to the first user operation, a battery protection mode;
    charging the battery in the battery protection mode; and
    stopping charging the battery in the battery protection mode when the first battery voltage reaches a second predetermined voltage (V2), wherein V1>V2.

4. The charging management method of claim 3, further comprising:
    displaying an enable option of the battery protection mode; and
    receiving a tap operation on the enable option.

5. The charging management method of claim 3, wherein a difference between V2 and V1 corresponds to the working parameter of the battery.

6. The charging management method of claim 1, wherein the first condition comprises a working duration of the battery at a high voltage and at a high temperature exceeds a first value.

7. The charging management method of claim 6, wherein the first condition further comprises an expansion parameter of the battery that is greater than a threshold.

8. The charging management method of claim 6, wherein the first condition further comprises an overall expansion parameter of the battery that is greater than a first critical value.

9. The charging management method of claim 1, further comprising:
    identifying that the working parameter meets a second condition; and
    recommending, in response to the identifying, user replacement of the battery.

10. The charging management method of claim 9, wherein the second condition comprises an expansion parameter of the battery that is greater than a second critical value.

11. A terminal comprising:
a touchscreen;
a battery; and
one or more processors coupled to the battery and the touchscreen and configured to cause the terminal to:
charge the battery;
stop charging the battery when the first battery voltage reaches a first predetermined voltage (V1);
obtain a working parameter of the battery from a first time when the battery is put into use to a current time; and
display, on the touchscreen, prompt information when the working parameter a first condition, wherein the working parameter comprises at least one of, first working durations of the battery at a plurality of temperatures, or second working durations of the battery at a plurality of second battery voltages.

12. The terminal of claim 11, wherein the one or more processors is further configured to display, in a form of a pop-up window, the prompt information at a top of the touchscreen.

13. The terminal of claim 11, wherein after displaying the prompt information, the one or more processors is further configured to:
receive a first user operation;
enable, in response to the first user operation, a battery protection mode;
charge the battery in the battery protection mode; and
stop charging the battery in the battery protection mode when the first battery voltage reaches a second predetermined voltage (V2), wherein V1>V2.

14. The terminal of claim 13, wherein a difference between V2 and V1 corresponds to the working parameter.

15. The terminal of claim 13, wherein the one or more processors is further configured to:
display an enable option of the battery protection mode on a battery setting interface; and
receive a tap operation on the enable option.

16. The terminal of claim 11, wherein the one or more processors is further configured to:
identify that the working parameter meets a second condition; and
recommend, in response to the identifying, user replacement of the battery.

17. A computer program product comprising computer-executable instructions stored on a non-transitory computer-readable storage medium that, when executed by one or more processors, cause a terminal to:
charge a battery of the terminal;
stop charging the battery when a first battery voltage of the battery reaches a first predetermined voltage (V1); and subsequently
obtain a working parameter of the battery from a first time when the battery is put into use to a current time; and
display prompt information when the working parameter meets a first condition, wherein the working parameter comprises at least one of first working durations of the battery at a plurality of temperatures or second working durations of the battery at a plurality of second battery voltages.

18. The computer-executable instructions stored on a non-transitory computer-readable storage medium of claim 17, wherein the instructions, when executed by one or more processors, cause a terminal to: after displaying the prompt information:
receive a first user operation;
enable, in response to the first user operation, a battery protection mode;
charge the battery in the battery protection mode; and
stop charging the battery in the battery protection mode when the first battery voltage reaches a second predetermined voltage (V2), wherein V1>V2.

19. The computer-executable instructions stored on a non-transitory computer-readable storage medium of claim 17, wherein a difference between V2 and V1 corresponds to the working parameter.

20. The computer-executable instructions stored on a non-transitory computer-readable storage medium of claim 17, wherein the instructions, when executed by one or more processors, cause a terminal to:
display an enable option of the battery protection mode on a battery setting interface; and
receive a tap operation on the enable option.

* * * * *